(12) United States Patent
Baeg et al.

(10) Patent No.: US 11,592,571 B2
(45) Date of Patent: Feb. 28, 2023

(54) FREE SPACE DETECTION APPARATUS AND FREE SPACE DETECTION METHOD

(71) Applicants: Hyundai Motor Company, Seoul (KR); Kia Motors Corporation, Seoul (KR)

(72) Inventors: Ju Heon Baeg, Seoul (KR); Byoung Kwang Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 277 days.

(21) Appl. No.: 17/014,645

(22) Filed: Sep. 8, 2020

(65) Prior Publication Data

US 2021/0364639 A1    Nov. 25, 2021

(30) Foreign Application Priority Data

May 22, 2020   (KR) .................. 10-2020-0061714

(51) Int. Cl.
| | | |
|---|---|---|
| *G01S 17/89* | (2020.01) | |
| *G01S 17/931* | (2020.01) | |
| *G01S 17/42* | (2006.01) | |
| *G01S 7/48* | (2006.01) | |
| *G05D 1/00* | (2006.01) | |
| *G06V 20/58* | (2022.01) | |

(52) U.S. Cl.
CPC ............ *G01S 17/89* (2013.01); *G01S 7/4808* (2013.01); *G01S 17/42* (2013.01); *G01S 17/931* (2020.01); *G05D 1/0077* (2013.01); *G05D 2201/0213* (2013.01); *G06V 20/586* (2022.01)

(58) Field of Classification Search
CPC ........ G01S 17/89; G01S 17/931; G01S 17/42; G01S 7/4808
See application file for complete search history.

(56) References Cited

U.S. PATENT DOCUMENTS

| | | | | |
|---|---|---|---|---|
| 9,111,451 | B2* | 8/2015 | Shin ........................ | G08G 1/16 |
| 9,910,136 | B2* | 3/2018 | Heo ........................ | G01S 17/89 |
| 10,634,793 | B1* | 4/2020 | Siao ....................... | G08G 1/166 |

* cited by examiner

Primary Examiner — Bryan Bui
(74) Attorney, Agent, or Firm — Fox Rothschild LLP

(57) ABSTRACT

A free space detection apparatus for a vehicle is provided to detect a free space based on a lidar sensor and recognize a driving environment. The apparatus includes a point data processor that removes noise of point data acquired from the LIDAR sensor and derives a half line with respect to an obstacle point from which noise has been removed based on coordinates of the obstacle point. A map processor generates a map for space classification, checks whether the obstacle point or the half line with respect to the obstacle point is present in a cell of the map and determines cell states of the map. A free space detector detects a free space based on the cell states of the map.

18 Claims, 15 Drawing Sheets

Before detection of road surface     After detection of road surface

Before height thresholding

After height thresholding

FREE SPACE DETECTION APPARATUS AND FREE SPACE DETECTION METHOD

CROSS-REFERENCE TO RELATED APPLICATION(S)

This application claims the benefit of Korean Patent Application No. 10-2020-0061714, filed on May 22, 2020, which is hereby incorporated by reference as if fully set forth herein.

BACKGROUND

Field of the Disclosure

The present disclosure relates to a free space detection apparatus, and more specifically, to a free space detection apparatus and a free space detection method for a vehicle that detects an unoccupied space based on a LIDAR sensor to recognize a driving environment.

Discussion of the Related Art

In general, a core of autonomous vehicle and advanced driver assistance systems (ADAS) technology development is a technology for acquiring correct and reliable information about surrounding environments. To acquire surrounding environment information with high reliability, a method of fusing information collected from sensors mounted in a vehicle, extracting necessary information and using the extracted information is widely used.

Free space detection in a process of acquiring surrounding environment information is a process necessary for recognizing a driving environment of a vehicle. A free space is a space in which no obstacle is present and a vehicle may travel to. A free space with high accuracy needs to be detected to generate a reliable driving route. However, processing procedures that require a large number of calculations such as deep learning, filtering, a depth map, and perspective transformation need to be performed when a free space is detected based on a vision sensor.

Furthermore, when an object that is difficult to discriminate from a road is present, the vision sensor misrecognizes the object as a free space and thus provides collision risk. In addition, when a free space is detected based on radar, sensor performance and information resolution deteriorate. Accordingly, development of a free space detection apparatus capable of detecting a correct free space while minimizing the number of calculations and possibility of misrecognition is required.

SUMMARY

An object of the present disclosure provides a free space detection apparatus and method that detect a correct free space while minimizing the number of calculations and possibility of misrecognition by deriving obstacle points and half lines thereof from point data of a lidar sensor and determining cell states of a map.

Furthermore, another object of the present disclosure is to provide a free space detection apparatus and method which may secure a safe free space that is less likely to be misrecognized using lidar that is a distance sensor with higher performance than a vision sensor. Another object of the present disclosure is to provide a free space detection apparatus and method which may secure a more accurate and reliable three-dimensional (3D) free space than a free space detected by a vision sensor which is a two-dimensional (2D) feature, using LIDAR point data that is a 3D feature.

A further object of the present disclosure is to provide a free space detection apparatus and method which may secure a free space with high reliability with a smaller number of calculations. It will be appreciated by persons skilled in the art that the objects that could be achieved with the present disclosure are not limited to what has been particularly described hereinabove and the above and other objects that the present disclosure could achieve will be more clearly understood from the following detailed description.

To accomplish the objects, a free space detection apparatus according to an exemplary embodiment of the present disclosure may include: a point data processor configured to remove noise of point data acquired form a lidar sensor and derive a half line with respect to an obstacle point from which noise has been removed based on coordinates of the obstacle point; a map processor configured to generate a map for space classification, check whether the obstacle point or the half line with respect to the obstacle point is present in a cell of the map and determine cell states of the map; and a free space detector configured to detect a free space based the cell states of the map.

A free space detection method of a free space detection apparatus according to an exemplary embodiment of the present disclosure is a free space detection method of a free space detection apparatus including a point data processor, a map processor and a free space detector, the method may include: the point data processor acquiring lidar point data; the point data processor removing noise of the lidar point data; the point data processor deriving a half line with respect to an obstacle point from which noise has been removed based on coordinates of the obstacle point; the map processor generating a map for space classification; the map processor checking whether the obstacle point or the half line with respect to the obstacle point is represent in a cell of the map; the map processor determining cell states of the map; and the free space detector detecting a free space based on the cell states of the map.

A non-transitory computer-readable recording medium storing a program for executing a free space detection method of a free space detection apparatus according to an exemplary embodiment of the present disclosure may perform processes provided in the free space detection method of the free space detection apparatus.

A vehicle according to an exemplary embodiment of the present disclosure may include: a LIDAR sensor; a free space detection apparatus configured to detect a free space based on point data acquired from the lidar sensor; and a driving environment information providing apparatus configured to provide driving environment information based on the detected free space. The free space detection apparatus may include: a point data processor configured to remove noise of point data acquired from the lidar sensor and derive a half line with respect to an obstacle point from which noise has been removed based on coordinates of the obstacle point; a map processor configured to generate a map for space classification, check whether the obstacle point or the half line with respect to the obstacle point is present in a cell of the map and determine cell states of the map; and a free space detector configured to detect a free space based on the cell states of the map.

The free space detection apparatus and method according to at least one exemplary embodiment of the present disclosure configured as above may be configured to detect a correct and accurate free space while minimizing the number of calculations and possibility of misrecognition by deriving obstacle points and half lines thereof from point data of a lidar sensor and determining cell states of a map. In other words, the present disclosure may secure a safe free space that is less likely to be misrecognized using lidar that is a distance sensor with higher performance than a vision sensor.

Furthermore, the present disclosure may be configured to detect a free space with high accuracy using lidar point data that is a 3D feature. The present disclosure may also be configured to detect a free space with high reliability with a small number of calculations and generate a reliable driving route. The present disclosure may be applied as a redundant system of a camera and a radar free space detection system. Additionally, the present disclosure may maintain performance necessary to independently generate a driving route even when the camera and the radar free space detection system fail.

The present disclosure may improve the operating speed of a recognition system and conserve a memory by checking object validity. Furthermore, the present disclosure may use a detected free space for a driving environment determination system, a driving route generation system, a positioning system, and the like. The present disclosure is applicable to any type of lidar sensor having an output format of point cloud data. In addition, the present disclosure is applicable to all systems capable of performing a code operation, such as personal computer (PC) systems such as Windows PC and LINUX PC, and vehicle embedded systems such as DRV II board.

It will be appreciated by persons skilled in the art that the effects that may be achieved with the present disclosure are not limited to what has been particularly described hereinabove and other advantages of the present disclosure will be more clearly understood from the following detailed description.

BRIEF DESCRIPTION OF THE DRAWINGS

The objects, features and advantages of the present disclosure will be more apparent from the following detailed description in conjunction with the accompanying drawings, in which.

DETAILED DESCRIPTION

Figure 1:
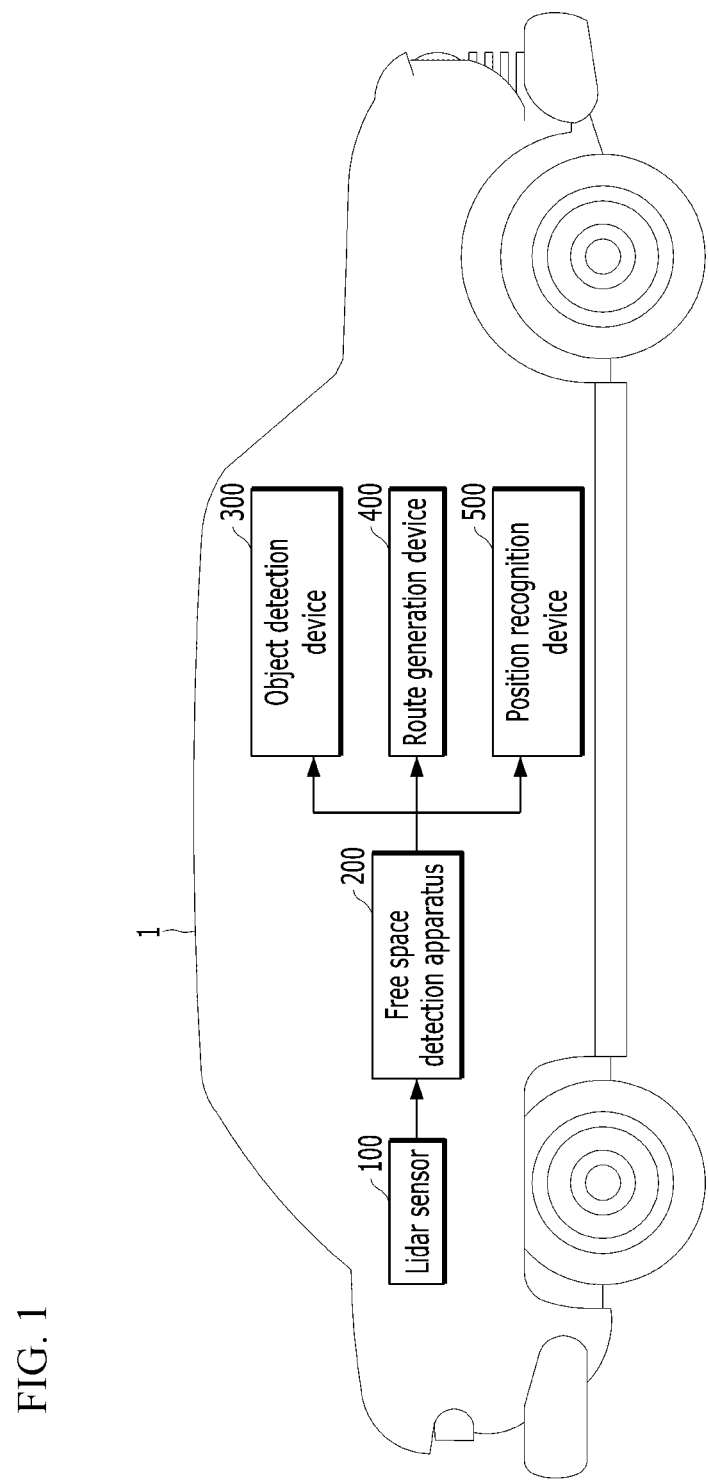
FIGS. 1 and 2 are diagrams for describing a vehicle including a free space detection apparatus according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The detailed description of the exemplary embodiments of the present disclosure will be given to enable those skilled in the art to implement and practice the disclosure with reference to the attached drawings. However, the present disclosure may be implemented in various different forms and is not limited to embodiments described herein. In addition, parts that are not related to description will be omitted for clear description in the drawings, and the same reference numbers will be used throughout this specification to refer to the same or like parts. Further, the term "-er(or)", "module", "portion" or "part" is used to signify a unit for performing at least one function or operation, and the unit can be realized as hardware, software, or in combination of both.

Figure 2:
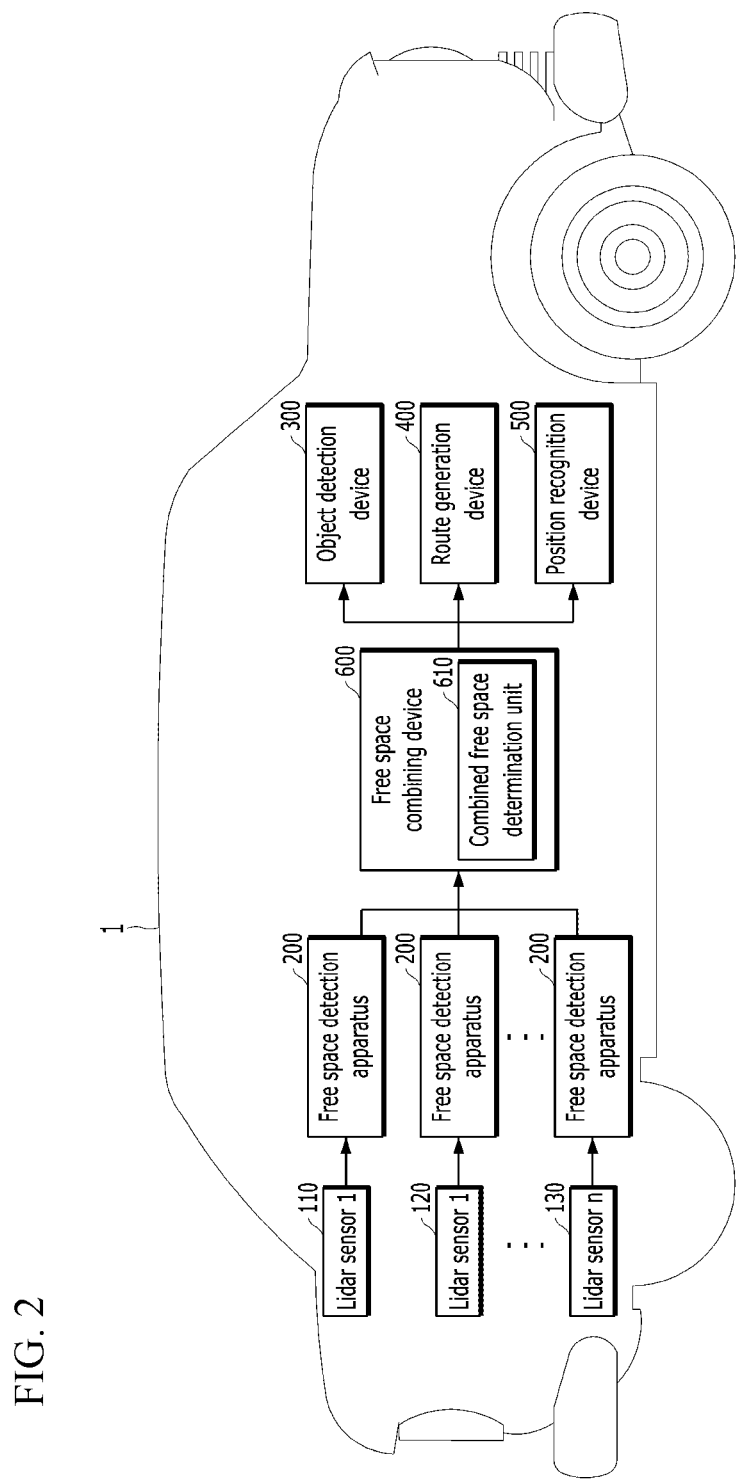

Hereinafter, an apparatus and method for detecting a free space to which exemplary embodiments of the present disclosure are applicable will be described with reference to FIGS. 1 to 19. FIGS. 1 and 2 are diagrams for describing a vehicle including a free space detection apparatus according to an exemplary embodiment of the present disclosure.

FIG. 1 is a diagram for describing a vehicle which detects a free space using a single lidar sensor. As shown in FIG. 1, the vehicle 1 of the present disclosure may include a lidar sensor 100, a free space detection apparatus 200 configured to detect a free space (e.g., unoccupied space) based on point data acquired from the lidar sensor 100, and a driving environment information providing apparatus configured to provide driving environment information based on the detected free space.

In particular, the driving environment information providing apparatus may include an object detection device 300, a route generation device 400, and a position recognition device 500, but the present disclosure is not limited thereto. In addition, the free space detection apparatus 200 may be configured to remove noise from point data acquired from the lidar sensor 100, derive a half line with respect to an obstacle point from which noise has been removed based on the coordinates of the obstacle point, generate a map for space classification, check whether an obstacle point or a half line with respect to the obstacle point is present in a cell of the map to determine a cell state of the map, and then detect a free space based on the cell state of the map.

When removing noise from point data, the free space detection apparatus 200 may be configured to detect road surface points from point data acquired from the lidar sensor 100, recognize the detected road surface points as noise and remove the noise. Further, when removing noise from the point data, the free space detection apparatus 200 may be configured to calculate a safe height based on the height of a host vehicle equipped with the free space detection apparatus 200 and remove points lower than the safe height by thresholding the points.

In addition, when deriving a half line with respect to an obstacle point, the free space detection apparatus 200 may be configured to derive a half line that has a gradient connecting the obstacle point and lidar coordinates and extends in a lidar beam scanning direction having the obstacle point as a starting point. When the free space detection apparatus 200 checks whether an obstacle point is present in a cell of the map, in response to determining that the coordinates of an obstacle point are $P(x_p, y_p)$ and the coordinates of a single cell point have $x_{min}$, $x_{max}$, $y_{min}$ and $y_{max}$, the free space detection apparatus 200 may be configured to confirm that the obstacle point is present in the cell when the obstacle point satisfies both a first condition of $x_{min}<x_p<x_{max}$ and a second condition of $y_{min}<y_p<y_{max}$.

Here, $x_{min}$ represents a value having a minimum x value from among vertexes of the cell and $x_{max}$ represents a value having a maximum x value from among the vertexes of the cell. $y_{min}$ represents a value having a minimum y value from among the vertexes of the cell and $y_{max}$ represents a value having a maximum y value from among the vertexes of the cell.

Further, when the free space detection apparatus 200 checks whether an obstacle point is present in a cell of the map, in response to determining that the coordinates of an obstacle point are $P(x_p, y_p, z_p)$ and the coordinates of a single cell point have $x_{min}$, $x_{max}$, $y_{min}$, $y_{max}$, $z_{min}$, and $z_{max}$, the free space detection apparatus 200 may be configured to confirm that the obstacle point is present in the cell when the obstacle point satisfies all of the first condition of $x_{min}<x_p<x_{max}$, the second condition of $y_{min}<y_p<y_{max}$ and a third condition of $z_{min}<z_p<z_{max}$.

Here, $x_{min}$ represents a value having a minimum x value from among vertexes of the cell and $x_{max}$ represents a value having a maximum x value from among the vertexes of the cell. $y_{min}$ represents a value having a minimum y value from among the vertexes of the cell and $y_{max}$ represents a value having a maximum y value from among the vertexes of the cell. $z_{min}$ represents a value having a minimum z value from among the vertexes of the cell and $z_{max}$ represents a value having a maximum z value from among the vertexes of the cell.

When the free space detection apparatus 200 checks whether a half line with respect to an obstacle point is present in a cell of the map, and determines that the coordinates of a cell point farthest from lidar coordinates $S(x_s, y_s)$ from among cell points of the map are $L(x_l, y_l)$, if an obstacle point that satisfies both a first condition of $x_p<x_l$ and $y_p<y_l$ and a second condition in which an obstacle point gradient is $$G_p = \frac{y_p - y_s}{x_p - x_s}$$

and a minimum gradient $G_{min}$ and a maximum gradient $G_{max}$ included in a single cell are $G_{min} < G_p < G_{max}$ is present, the free space detection apparatus 200 may be configured to confirm that a half line with respect to the obstacle point is present in the corresponding cell.

Further, when the free space detection apparatus 200 checks whether a half line with respect to an obstacle point is present in a cell of the map, and determines the coordinates of a cell point farthest from lidar coordinates $S(x_s, y_s, z_s)$ from among cell points of the map are $L(x_l, y_l, z_l)$, if there is an obstacle point that satisfies a first condition of $x_p < x_l$, $y_p < y_l$ and $z_p < z_l$ and satisfies any one of a second condition in which the coordinates of a single cell point have $x_{min}$, $x_{max}$, $y_{min}$, $y_{max}$, $z_{min}$ and $z_{max}$ and y and z calculated by substituting $x_{min}$ into first and third mathematical expressions from among the first mathematical expression $$\frac{x - x_s}{x_p - x_s} = \frac{y - y_s}{y_p - y_s},$$

a second mathematical expression $$\frac{y - y_s}{y_p - y_s} = \frac{z - z_s}{z_p - z_s}$$

and the third mathematical expression $$\frac{x - x_s}{x_p - x_s} = \frac{z - z_s}{z_p - z_s}$$

are $y_{min} < y < y_{max}$ and $z_{min} < z < z_{max}$, a third condition in which y and z calculated by substituting $x_{max}$ into the first and third mathematical expressions are $y_{min} < y < y_{max}$ and $z_{min} < z < z_{max}$, a fourth condition in which x and z calculated by substituting $y_{min}$ into the first and second mathematical expressions are $x_{min} < x < x_{max}$ and $z_{min} < z < z_{max}$, a fifth condition in which x and z calculated by substituting $y_{max}$ into the first and second mathematical expressions are $x_{min} < x < x_{max}$ and $z_{min} < z < z_{max}$, a sixth condition in which y and x calculated by substituting $z_{min}$ into the second and third mathematical expressions are $y_{min} < y < y_{max}$ and $x_{min} < x < x_{max}$, and a seventh condition in which y and x calculated by substituting $z_{max}$ into the second and third mathematical expressions are $y_{min} < y < y_{max}$ and $x_{min} < x < x_{max}$, the free space detection apparatus 200 may be configured to confirm that a half line with respect to the obstacle point is present in the corresponding cell.

Here, $x_{min}$ represents a value having a minimum x value from among vertexes of the cell and $x_{max}$ represents a value having a maximum x value from among the vertexes of the cell. $y_{min}$ represents a value having a minimum y value from among the vertexes of the cell and $y_{max}$ represents a value having a maximum y value from among the vertexes of the cell. $z_{min}$ represents a value having a minimum z value from among the vertexes of the cell and $z_{max}$ represents a value having a maximum z value from among the vertexes of the cell.

Subsequently, the free space detection apparatus 200 may be configured to determine that a state of a cell is an occupied state when an obstacle point is present in the cell, determine that the cell state is an unknown state when a half line of an obstacle point is present in the cell, and determine that the cell state is a free space state when any of an obstacle point and a half line thereof is not present in the cell.

FIG. 2 is a diagram for describing a vehicle which detects a free space by combining free spaces using a plurality of LIDAR sensors. As shown in FIG. 2, the vehicle 1 of the present disclosure may include a plurality of lidar sensors including a first lidar sensor 110, a second lidar sensor 120 and an n-th lidar sensor 130, the free space detection apparatus 200 configured to detect a free space based on point data acquired from each lidar sensor, a free space combining device 600 configured to combine free spaces detected for respective lidar sensors, and a driving environment information providing apparatus configured to provide driving environment information based on a combined free space.

In particular, the free space combining device 600 may include a combined free space determination unit 610 configured to determine a free space based on a combined cell state when cell states detected for respective LIDAR sensors are combined. In addition, the driving environment information providing apparatus may include the object detection device 300, the route generation device 400 and the position recognition device 500, but the present disclosure is not limited thereto.

In this manner, the present disclosure may be configured to detect a final free space by combining cell states for respective lidar sensors when there is a plurality of LIDAR sensors. Particularly, when detecting a final free space, the present disclosure may be configured to detect the final free space by combining cell states for respective LIDAR sensors based on a degree of priority for each cell state.

Accordingly, the present disclosure may be configured to detect a correct and accurate free space while minimizing the number of calculations and possibility of misrecognition by deriving an obstacle point and a half line thereof from point data of lidar sensors and determining cell states of a map. In other words, the present disclosure may classify an area beyond an object as an unknown area that is not observed according to characteristics of the LIDAR sensor and classify an area observed as an area that is not occupied by an obstacle as a free space using characteristics of a distance sensor. Accordingly, the present disclosure may be configured to detect a free space using a half line of obstacle point data and detect a free space with high reliability with a smaller number of calculations using only point data without an additional feature.

Figure 3:
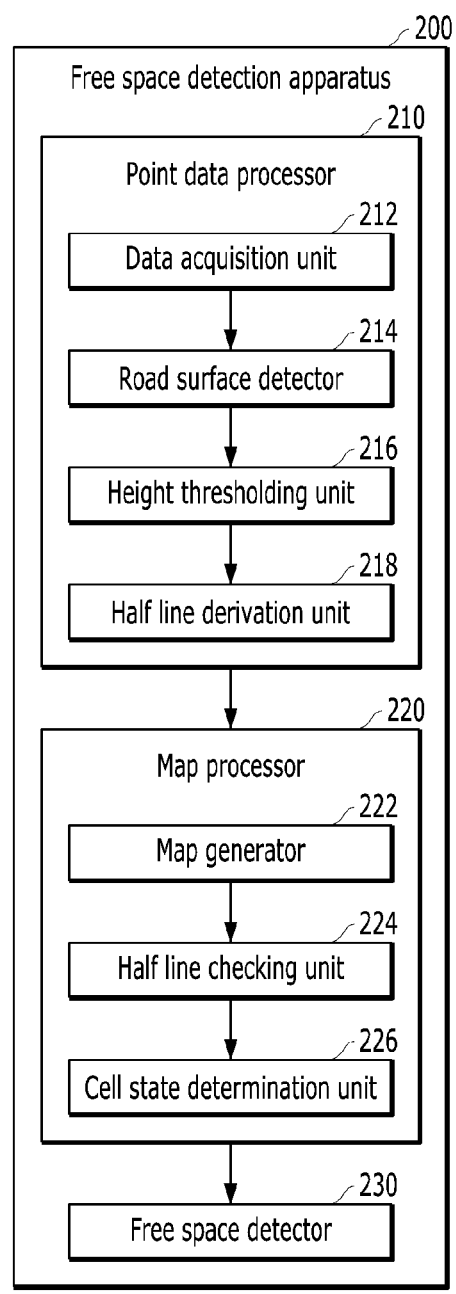
FIG. 3 is a block diagram for describing the free space detection apparatus according to an exemplary embodiment of the present disclosure.

FIG. 3 is a block diagram for describing a free space detection apparatus according to an exemplary embodiment of the present disclosure. As shown in FIG. 3, the free space detection apparatus 200 of the present disclosure may include a point data processor 210, a map processor 220, and a free space detector 230.

The point data processor 210 may be configured to remove noise of point data acquired from a LIDAR sensor and derive a half line with respect to an obstacle point from which noise has been removed based on the coordinates of the obstacle point. In particular, the point data processor 210 may include a data acquisition unit 212, a road surface detector 214, a height thresholding unit 216, and a half line derivation unit 218.

The data acquisition unit 212 of the point data processor 210 may be configured to acquire point data from a LIDAR sensor. The road surface detector 214 of the point data processor 210 may be configured to detect road surface points from point data acquired from the LIDAR sensor, recognize the detected road surface points as noise and remove the noise.

The height thresholding unit 216 of the point data processor 210 may be configured to calculate a safe height based on the height of the host vehicle and remove points lower than the safe height by thresholding the points. In particular, the height thresholding unit 216 may be configured to acquire the height of the host vehicle by receiving host vehicle information from a storage of the host vehicle when calculating the safe height based on the height of the host vehicle.

In some cases, the height thresholding unit 216 may be configured to acquire the height of the host vehicle by receiving host vehicle information from an external server when calculating the safe height based on the height of the host vehicle. Further, the height thresholding unit 216 may be configured to calculate the safe height such that the safe height is higher than the height of the host vehicle based on a host vehicle height suitable for driving when calculating the safe height based on the height of the host vehicle.

In some cases, the height thresholding unit 216 may be configured to detect road surface points from point data acquired from the lidar sensor, remove the detected road surface points and then calculate the safe height based on the height of the host vehicle when calculating the safe height based on the height of the host vehicle. The half line derivation unit 218 of the point data processor 210 may be configured to derive a half line with respect to an obstacle point from which noise has been removed based on the coordinates of the obstacle point.

In particular, the half line derivation unit 218 may be configured to derive a half line having a gradient connecting an obstacle point and lidar coordinates $S(x_s, y_s)$ and extending in a LIDAR beam scanning direction having the obstacle point as a starting point. For example, the half line derivation unit 218 may be configured to derive a 2D half line with respect to an obstacle point according to the following mathematical expression (wherein, the coordinates of the obstacle point are $P(x_p, y_p)$, lidar coordinates are $S(x_s, y_s)$, and $x_p \neq x_s$).

$$y = \frac{y_p - y_s}{x_p - x_s}(x - x_s) + y_s \begin{cases} x \geq x_p \text{ when } x_p > x_s \\ x \leq x_p \text{ when } x_p < x_s \\ y \geq y_p \text{ when } y_p > y_s \\ y \leq y_p \text{ when } y_p < y_s \end{cases}$$

Further, in boundary conditions, the half line derivation unit 218 may be configured to derive a 2D half line with respect to the aforementioned obstacle point according to the following mathematical expression (wherein, the coordinates of the obstacle point are $P(x_p, y_p)$).

$y \geq y_p$ when $x_p = 0$ and $y_p > y_s$
$y \leq y_p$ when $x_p = 0$ and $y_p < y_s$
$x \geq x_p$ when $y_p = 0$ and $x_p > x_s$
$x \leq x_p$ when $y_p = 0$ and $x_p < x_s$ Alternatively, the half line derivation unit 218 may be configured to derive a 3D half line with respect to an obstacle point according to the following mathematical expression (wherein, coordinates of the obstacle point are $P(x_p, y_p, z_p)$, lidar coordinates are $S(x_s, y_s, z_s)$, and $x_p \neq x_s$, $y_p \neq y_s$, $z_p \neq z_s$).

$$y = \frac{x - x_s}{x_p - x_s} = \frac{y - y_s}{y_p - y_s} = \frac{z - z_s}{z_p - z_s} \begin{cases} x \geq x_p \text{ when } x_p > x_s \\ x \leq x_p \text{ when } x_p < x_s \\ y \geq y_p \text{ when } y_p > y_s \\ y \leq y_p \text{ when } y_p < y_s \\ z \geq z_p \text{ when } z_p > z_s \\ z \leq z_p \text{ when } z_p < z_s \end{cases}$$

Further, in boundary conditions, the half line derivation unit 218 may be configured to derive a 3D half line with respect to an obstacle point according to the following mathematical expression.

$y \geq y_p$ when $x_p = 0$ and $z_p = 0$ and $y_p > y_s$
$y \leq y_p$ when $x_p = 0$ and $z_p = 0$ and $y_p < y_s$
$x \geq x_p$ when $y_p = 0$ and $z_p = 0$ and $x_p > x_s$
$x \leq x_p$ when $y_p = 0$ and $z_p = 0$ and $x_p < x_s$
$z \geq z_p$ when $x_p = 0$ and $y_p = 0$ and $z_p > z_s$
$z \leq z_p$ when $x_p = 0$ and $y_p = 0$ and $z_p < z_s$ The map processor 220 may be configured to generate a map for space classification and check whether an obstacle point or a half line with respect to the obstacle point is present in a cell of the map to determine cell states of the map. In particular, the map processor 220 may include a map generator 222, a half line checking unit 224, and a cell state determination unit 226.

The map generator 222 of the map processor 220 may be configured to generate a map for space classification. For example, the map generator 222 may be configured to generate a 2D map or a 3D map according to system requirements of the host vehicle. Particularly, when generating a map for space classification, the map generator 222 may be configured to generate a 2D map when a half line with respect to an obstacle point is derived using only (x, y) coordinate values of 3D point data (x, y, z) acquired from a lidar sensor.

In some cases, when generating a map for space classification, the map generator 222 may be configured to generate a 3D map when a half line with respect to an obstacle point is derived using (x, y, z) coordinate values of 3D point data acquired from the LIDAR sensor. The half line checking unit 224 of the map processor 220 may be configured to check whether an obstacle point or a half line with respect to the obstacle point is present in a cell of the map.

In particular, when the half line checking unit 224 checks whether an obstacle point is present in a cell of the map, and determines the coordinates of an obstacle point are $P(x_p, y_p)$ and the coordinates of a single cell point have $x_{min}$, $x_{max}$, $y_{min}$ and $y_{max}$, the half line checking unit 224 may be configured to confirm that the obstacle point is present in the corresponding cell when the obstacle point satisfies both a first condition of $x_{min} < x_p < x_{max}$ and a second condition of $y_{min} < y_p < y_{max}$.

Here, $x_{min}$ represents a value having a minimum x value from among vertexes of the cell and $x_{max}$ represents a value having a maximum x value from among the vertexes of the cell. $y_{min}$ represents a value having a minimum y value from among the vertexes of the cell and $y_{max}$ represents a value having a maximum y value from among the vertexes of the cell.

In some cases, when the half line checking unit 224 checks whether an obstacle point is present in a cell of the map, and determines the coordinates of an obstacle point are $P(x_p, y_p, z_p)$ and the coordinates of a single cell point have $x_{min}$, $x_{max}$, $y_{min}$, $y_{max}$, $z_{min}$, and $z_{max}$, the half line checking unit 224 may be configured to confirm that the obstacle point is present in the corresponding cell when the obstacle point satisfies all of the first condition of $x_{min}<x_p<x_{max}$, the second condition of $y_{min}<y_p<y_{max}$ and a third condition of $z_{min}<z_p<z_{max}$.

Particularly, $x_{min}$ represents a value having a minimum x value from among vertexes of the cell and $x_{max}$ represents a value having a maximum x value from among the vertexes of the cell. $y_{min}$ represents a value having a minimum y value from among the vertexes of the cell and $y_{max}$ represents a value having a maximum y value from among the vertexes of the cell. $z_{min}$ represents a value having a minimum z value from among the vertexes of the cell and $z_{max}$ represents a value having a maximum z value from among the vertexes of the cell.

Further, when the coordinates of a cell point farthest from the lidar coordinates $S(x_s, y_s)$ from among cell points of the map is $L(x_l, y_l)$, if there is an obstacle point that satisfies both a first condition of $x_p<x_l$ and $y_p<y_l$ and a second condition in which an obstacle point gradient is $$G_p = \frac{y_p - y_s}{x_p - x_s}$$

and a minimum gradient $G_{min}$ and a maximum gradient $G_{max}$ included in a single cell are $G_{min}<G_p<G_{max}$, the half line checking unit 224 may be configured to confirm that a half line with respect to the obstacle point is present in the corresponding cell.

In particular, the minimum gradient $G_{min}$ and the maximum gradient $G_{max}$ may vary according to domains where cells are positioned in the coordinate system, and the domains may be defined as follows.

First domain: $x>x_s$, $y>y_s$
Second domain: $x<x_s$, $y>y_s$
Third domain: $x<x_s$, $y<y_s$
Fourth domain: $x>x_s$, $y<y_s$ The first condition indicates to that an obstacle point P to be detected on x and y should be present between LIDAR coordinates S and a cell point L farthest from the LIDAR coordinates.

The mathematical expressions described in the present disclosure are expressions for a case in which a domain to which a cell point belongs corresponds to $x_l>x_s$, $y_l>y_s$, and signs in the mathematical expressions may be changed according to a domain to which a cell point belongs. In some cases, when the coordinates of a cell point farthest from LIDAR coordinates $S(x_s, y_s, z_s)$ from among cell points of the map are $L(x_l, y_l, z_l)$, if there is an obstacle point that satisfies a first condition of $x_p<x_l$, $y_p<y_l$ and $z_p<z_l$ and satisfies any one of a second condition in which the coordinates of a single cell point have $x_{min}$, $x_{max}$, $y_{min}$, $y_{max}$, $z_{min}$ and $z_{max}$ and y and z calculated by substituting $x_{min}$ into first and third mathematical expressions from among the first mathematical expression $$\frac{x - x_s}{x_p - x_s} = \frac{y - y_s}{y_p - y_s},$$

a second mathematical expression $$\frac{y - y_s}{y_p - y_s} = \frac{z - z_s}{z_p - z_s}$$

and the third mathematical expression $$\frac{x - x_s}{x_p - x_s} = \frac{z - z_s}{z_p - z_s}$$

are $y_{min}<y<y_{max}$ and $z_{min}<z<z_{max}$, a third condition in which y and z calculated by substituting $x_{max}$ into the first and third mathematical expressions are $y_{min}<y<y_{max}$ and $z_{min}<z<z_{max}$, a fourth condition in which x and z calculated by substituting $y_{min}$ into the first and second mathematical expressions are $x_{min}<x<x_{max}$ and $z_{min}<z<z_{max}$, a fifth condition in which x and z calculated by substituting $y_{max}$ into the first and second mathematical expressions are $x_{min}<x<x_{max}$ and $z_{min}<z<z_{max}$, a sixth condition in which y and x calculated by substituting $z_{min}$ into the second and third mathematical expressions are $y_{min}<y<y_{max}$ and $x_{min}<x<x_{max}$, and a seventh condition in which y and x calculated by substituting $z_{max}$ into the second and third mathematical expressions are $y_{min}<y<y_{max}$ and $x_{min}<x<x_{max}$, the half line checking unit 224 may be configured to confirm that a half line with respect to the obstacle point is present in the corresponding cell.

Here, $x_{min}$ represents a value having a minimum x value from among vertexes of the cell and $x_{max}$ represents a value having a maximum x value from among the vertexes of the cell. $y_{min}$ represents a value having a minimum y value from among the vertexes of the cell and $y_{max}$ represents a value having a maximum y value from among the vertexes of the cell. $z_{min}$ represents a value having a minimum z value from among the vertexes of the cell and $z_{max}$ represents a value having a maximum z value from among the vertexes of the cell.

Further, the first condition indicates that an obstacle point P to be detected on x, y and z should be present between LIDAR coordinates S and a cell point L farthest from the LIDAR coordinates. The mathematical expressions described in the present disclosure are expressions for a case in which a domain to which a cell point belongs corresponds to $x_l>x_s$, $y_l>y_s$, and $z_l>z_s$, and signs in the mathematical expressions may be changed according to a domain to which a cell point belongs.

The cell state determination unit 226 of the map processor 220 may be configured to determine cell states of the map. In particular, the cell state determination unit 226 may be configured to determine that a state of a cell is an occupied state when an obstacle point is present in the cell, determine that the cell state is an unknown state when a half line of an obstacle point is present in the cell, and determine that the cell state is a free space state when any of an obstacle point and a half line thereof is not present in the cell.

Meanwhile, the free space detector 230 may be configured to detect a free space based on cell states of the map. In some cases, when there is a plurality of lidar sensors, the free space detector 230 may be configured to detect a final free space by combining cell states for the respective LIDAR sensors. In particular, the free space detector 230 may be configured to detect a final free space by combining cell states for the respective LIDAR sensors based on a degree of priority for each cell state.

For example, with respect to a degree of priority for each cell state, a degree of priority of a cell state corresponding to an occupied state may be highest, a degree of priority of a cell state corresponding to an unknown state may be lowest, a degree of priority of a cell state corresponding to a free space state may be lower than the degree of priority of the occupied state and higher than the degree of priority of the unknown state.

In other cases, when a plurality of LIDAR sensors has different fields of view (FOV), the free space detector 230 may be configured to secure an additional free space by combining cell states for the LIDAR sensors having different field of view (FOV) and detect a final free space including the additional free space.

Figure 4A:
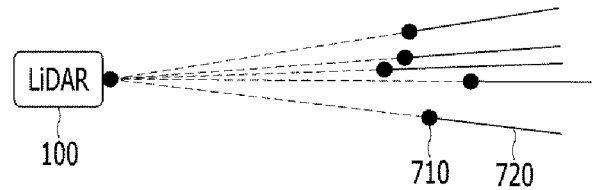
FIGS. 4A to 4D are diagrams for describing a free space determination process according to an exemplary embodiment of the present disclosure.

FIGS. 4A to 4D are diagrams for describing a free space determination process. As shown in FIG. 4A, the present disclosure may be configured to derive half lines 720 with respect to all obstacle points 710. In particular, a half line 720 refers to a straight line that has a straight gradient connecting the coordinates of the lidar sensor 100 and coordinates of an obstacle point 710 and extends in a LIDAR beam scanning direction having the coordinates of the obstacle point 710 as a starting point.

Figure 4B:
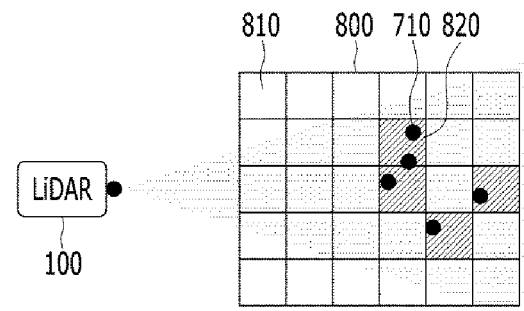
Figure 4C:
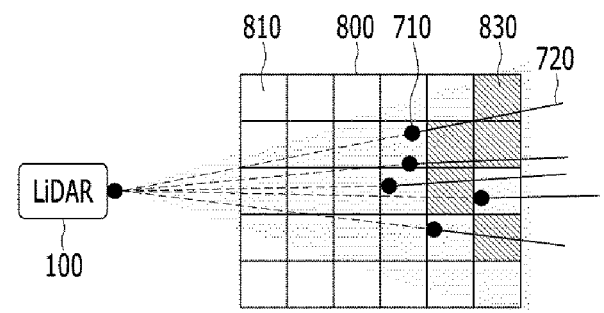

As shown in FIG. 4B, when obstacle points 710 are present in cells 810 of a map 800, the present disclosure may be configured to determine the cell state of the corresponding cells as an occupied state 820. As shown in FIG. 4C, when half lines 720 of obstacle points 710 are present in cells 810 of the map 800 although the cells 810 are not in the occupied state 820, the present disclosure may be configured to determine the cell state of the corresponding cells as an unknown state 830.

Figure 4D:
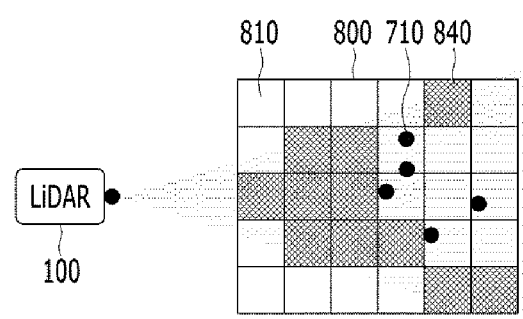

As shown in FIG. 4D, when cells 810 of the map 800 are not in the occupied state 820 and the unknown state 830, the present disclosure may be configured to determine the cell state of the corresponding cells as a free space state 840. In this manner, the present disclosure may be configured to determine a cell state as the occupied state 820 when obstacle points 710 are present in the cells 810 of the map 800, determine a cell state as the unknown state 830 when half lines 720 of obstacle points 710 are present in the cells 810, and determine a cell state as the free space state 840 when any of obstacle points 710 and half lines thereof is not present in the cells 810.

Figure 5:
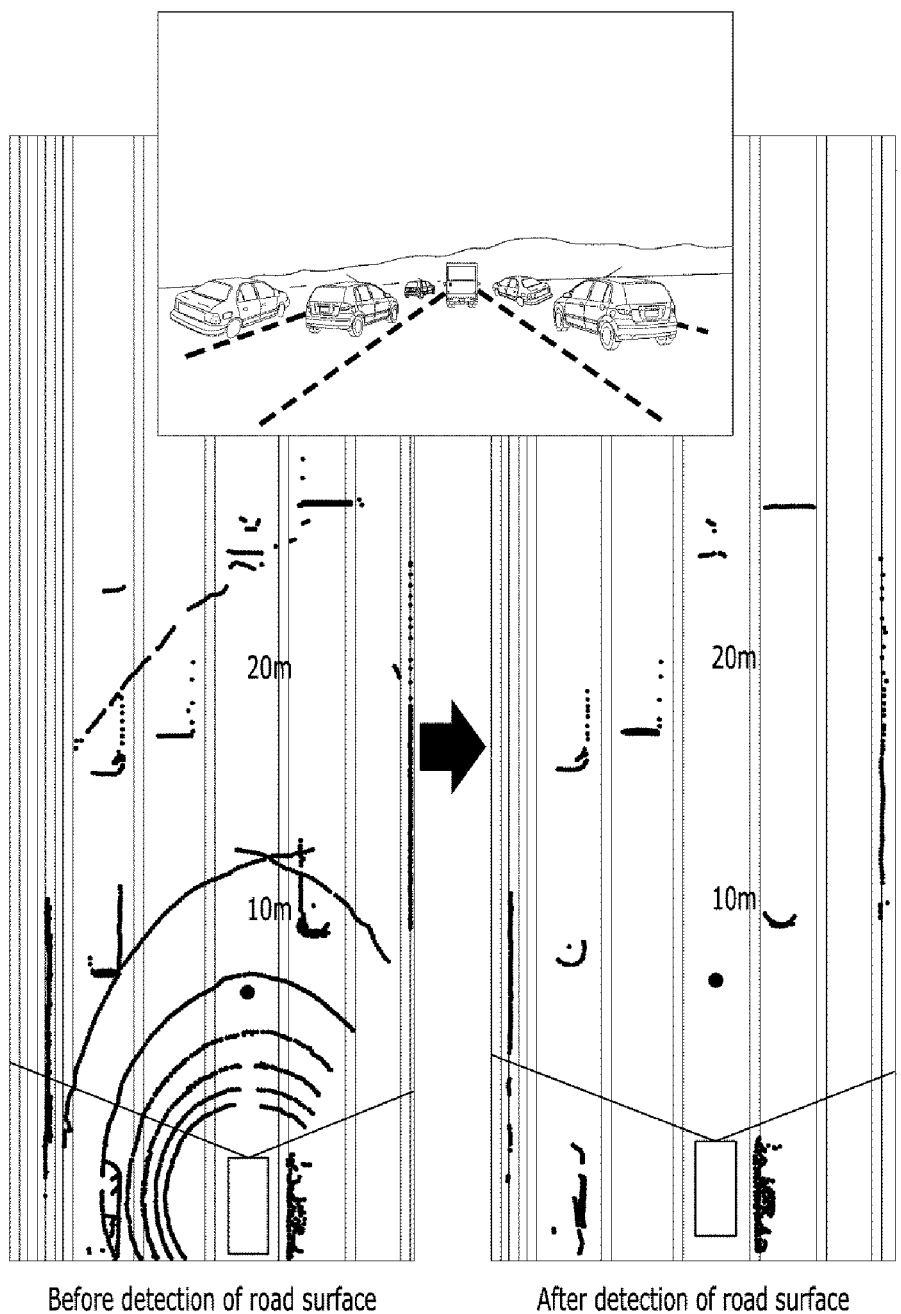
FIG. 5 is a diagram for describing a road surface point removal process according to an exemplary embodiment of the present disclosure.
Figure 6:
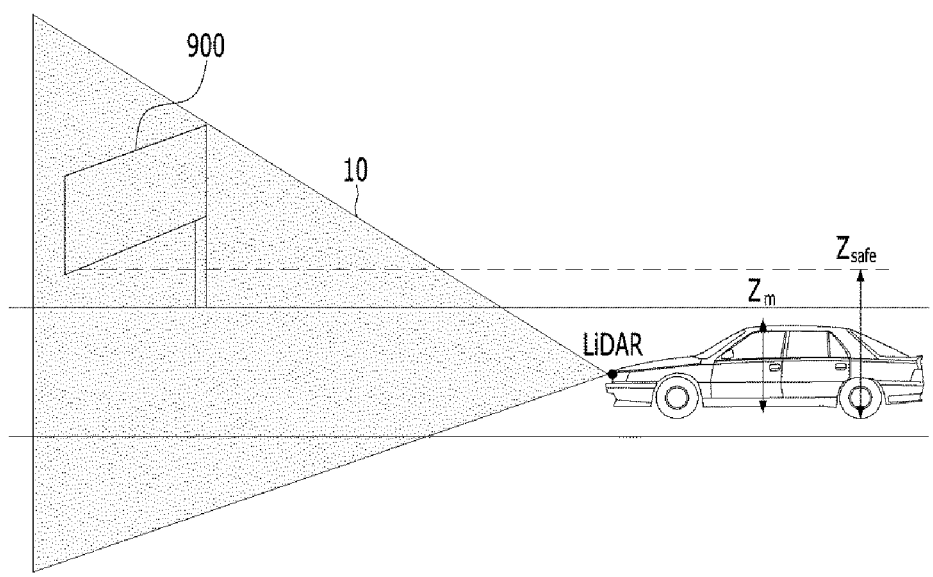
FIG. 6 is a diagram for describing a point height thresholding process according to an exemplary embodiment of the present disclosure.
Figure 7A:
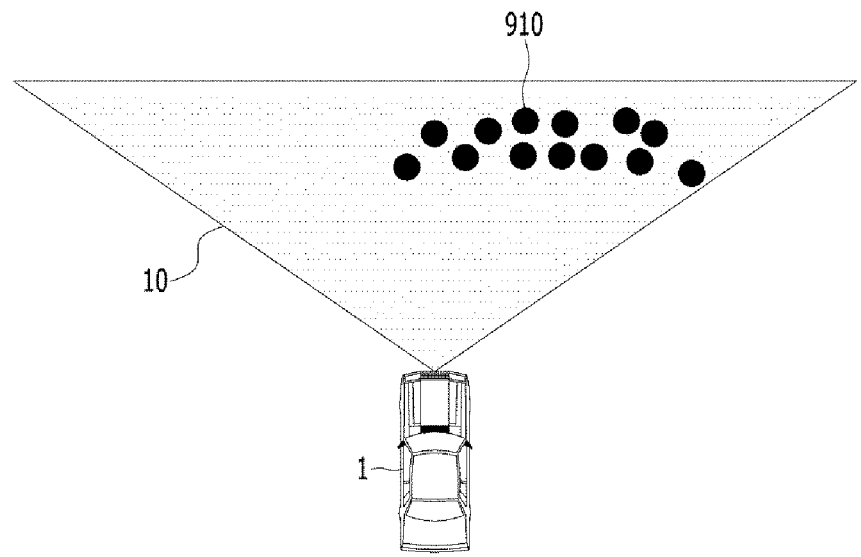
FIGS. 7A and 7B are diagrams showing point distributions before and after height thresholding according to an exemplary embodiment of the present disclosure.
Figure 7B:
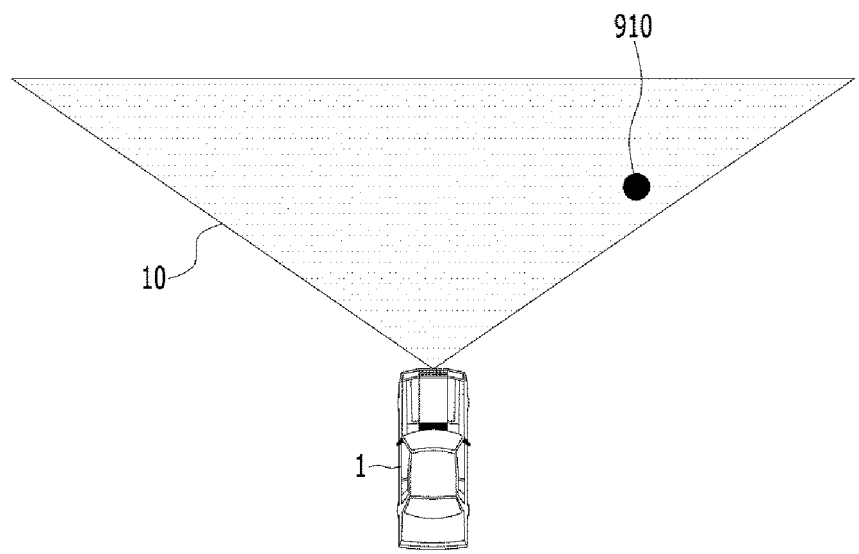

FIG. 5 is a diagram for describing a road surface point removal process, FIG. 6 is a diagram for describing a point height thresholding process and FIGS. 7A and 7B are diagrams showing point distributions before and after height thresholding. As shown in FIG. 5, the present disclosure may be configured to detect road surface points from point data acquired from a lidar sensor, recognize the detected road surface points as noise and remove the noise.

This is for the purpose of removing unnecessary road surface points to minimize the number of calculations corresponding to free space detection and removing parts of the ground instead of obstacles to detect an actual free space. Subsequently, the present disclosure may be configured to calculate a safe height $Z_{safe}$ based on the height of the vehicle 1, as shown in FIG. 6. In particular, the present disclosure may be configured to acquire the height of the vehicle 1 by receiving vehicle information from the storage of the vehicle 1.

In some cases, the present disclosure may be configured to acquire the height of the vehicle 1 by receiving vehicle information from an external server. Further, the present disclosure may be configured to calculate the safe height such that the safe height is higher than the height of the vehicle in consideration of a height of the vehicle 1 suitable for driving. The present disclosure may be configured to detect road surface points from point data acquired from the LIDAR sensor, remove the detected road surface points, and then calculate the safe height based on the height of the vehicle.

In addition, the present disclosure may threshold LIDAR points having heights less than the calculated save height $Z_{safe}$ and an obstacle 900 to remove the LIDAR points. In other words, the present disclosure may be configured to remove LIDAR points lower than a height value $Z_m$ of a LIDAR point at which road surface points have been removed through thresholding. The height value $Z_m$ of the LIDAR point may be lower than the safe height $Z_{safe}$ ($Z_m < Z_{safe}$).

As shown in FIGS. 7A and 7B, when height thresholding is performed on a plurality of LIDAR points 910 within the field of view (FOV) 10 of the LIDAR sensor of the vehicle 1, only obstacle points may remain. In other words, according to the present disclosure, only obstacle points from among lidar points may remain when road surface removal and height thresholding processing is performed on the LIDAR points. In this manner, the present disclosure may be configured to detect an actual free space and minimize the number of calculations by removing points having heights in which a vehicle is unable to travel.

Figure 8:
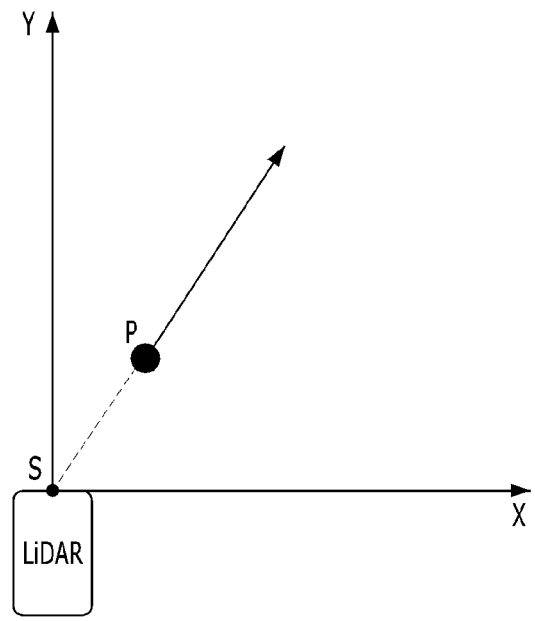
FIG. 8 is a diagram for describing a process of deriving a half line in a 2D plane according to an exemplary embodiment of the present disclosure.

FIG. 8 is a diagram for describing a process of deriving a half line in a 2D plane. As shown in FIG. 8, the present disclosure may derive a half line with respect to an obstacle point P based on the coordinates of the obstacle point P. In other words, the present disclosure may be configured to derive a half line that has a gradient connecting the obstacle point P and LIDAR coordinates S and extends in a LIDAR beam scanning direction having the obstacle point P as a starting point.

The LIDAR coordinates S indicate an offset of a position at which a sensor is set based on the origin of the coordinate system and generally have a value of (0, 0) when the coordinate system is constructed through calibration. In particular, the origin of the coordinate system may be varied according to the center, a front bumper, a roof and the like of a vehicle and may also be changed in the case of a multi-sensor system.

In the present specification, the origin of the coordinate system is represented as S(0, 0) in the drawings and represented as $S(x_s, y_s)$ in mathematical expressions. The present disclosure may be configured to derive a 2D half line with respect to an obstacle point using the following mathematical expression (wherein, the coordinates of the obstacle point are $P(x_p, y_p)$, lidar coordinates are $S(x_s, y_s)$, and $x_p \neq x_s$).

$$y = \frac{y_p - y_s}{x_p - x_s}(x - x_s) + y_s \begin{cases} x \geq x_p & \text{when } x_p > x_s \\ x \leq x_p & \text{when } x_p < x_s \\ y \geq y_p & \text{when } y_p > y_s \\ y \leq y_p & \text{when } yp < y_s \end{cases}$$

In boundary conditions, the present disclosure may be configured to derive a 2D half line with respect to the obstacle point using the following mathematical expression (wherein, the coordinates of the obstacle point are $P(x_p, y_p)$).

Figure 9:
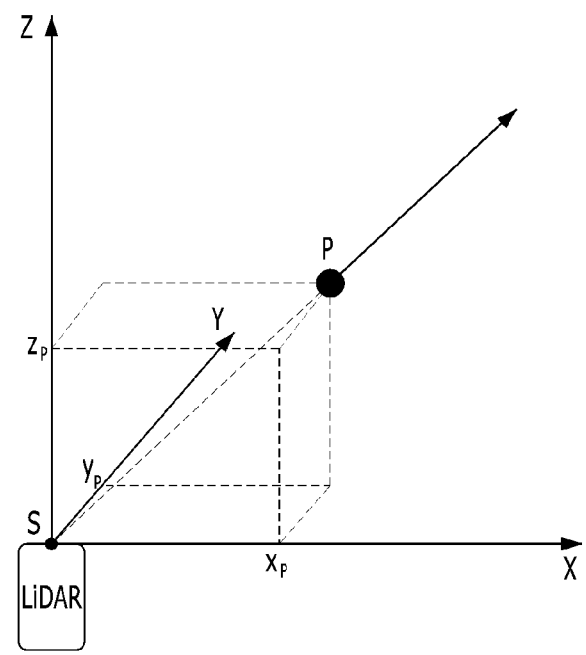
FIG. 9 is a diagram for describing a process of deriving a half line in a 3D space according to an exemplary embodiment of the present disclosure.

$y \geq y_p$ when $x_p = 0$ and $y_p > y_s$
$y \leq y_p$ when $x_p = 0$ and $y_p < y_s$
$x \geq x_p$ when $y_p = 0$ and $x_p > x_s$
$x \leq x_p$ when $y_p = 0$ and $x_p < x_s$ FIG. 9 is a diagram for describing a process of deriving a half line in a 3D space. As shown in FIG. 9, the present disclosure may be configured to derive a half line with respect to an obstacle point P based on the coordinates of the obstacle point P. In other words, the present disclosure may be configured to derive a half line that has a gradient connecting the obstacle point P and LIDAR coordinates S and extends in a lidar beam scanning direction having the obstacle point P as a starting point.

The LIDAR coordinates S indicate an offset of a position at which a sensor is set based on the origin of the coordinate system and generally have a value of (0, 0) when the coordinate system is constructed through calibration. In particular, the origin of the coordinate system may be varied according to the center, a front bumper, a roof and the like of a vehicle and may also be changed in the case of a multi-sensor system.

In the present specification, the origin of the coordinate system is represented as S(0, 0, 0) in the drawings and represented as $S(x_s, y_s, z_s)$ in mathematical expressions. The present disclosure may be configured to derive a 3D half line with respect to an obstacle point according to the following mathematical expression (wherein, coordinates of the obstacle point are $P(x_p, y_p, z_p)$, LIDAR coordinates are $S(x_s, y_s, z_s)$, and $x_p \neq x_s$, $y_p \neq y_s$, $z_p \neq z_s$).

$$y = \frac{x - x_s}{x_p - x_s} = \frac{y - y_s}{y_p - y_s} = \frac{z - z_s}{z_p - z_s} \begin{cases} x \geq x_p \text{ when } x_p > x_s \\ x \leq x_p \text{ when } x_p < x_s \\ y \geq y_p \text{ when } y_p > y_s \\ y \leq y_p \text{ when } y_p < y_s \\ z \geq z_p \text{ when } z_p > z_s \\ z \leq z_p \text{ when } z_p < z_s \end{cases}$$

Further, in boundary conditions, the present disclosure may be configured to derive a 3D half line with respect to an obstacle point according to the following mathematical expression.

Figure 10A:
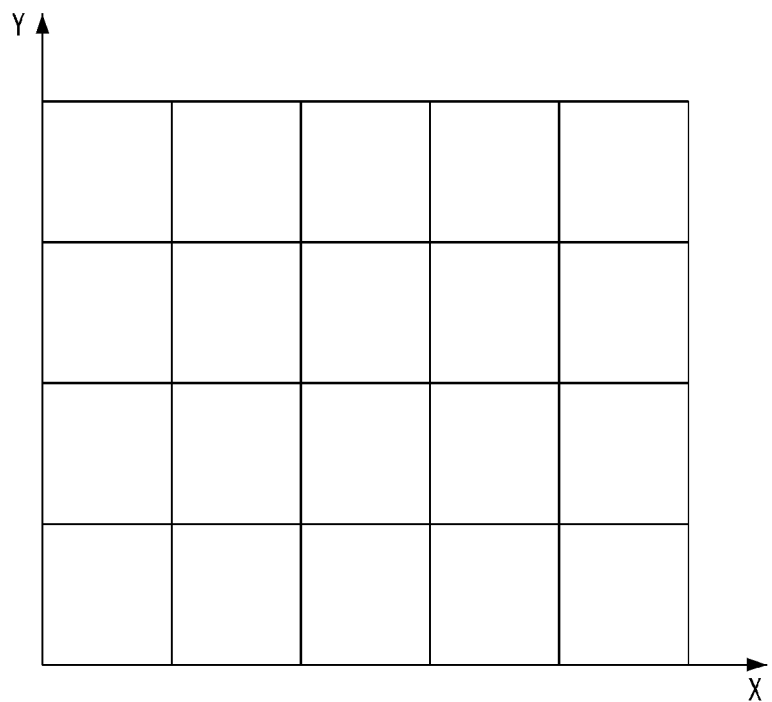
FIGS. 10A and 10B are diagrams showing lattice maps corresponding to an orthogonal coordinate system according to an exemplary embodiment of the present disclosure.
Figure 10B:
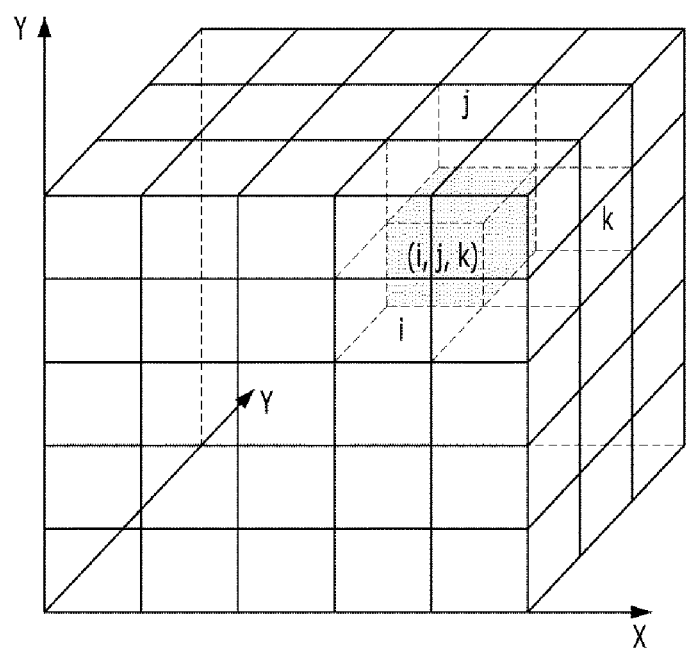
Figure 11A:
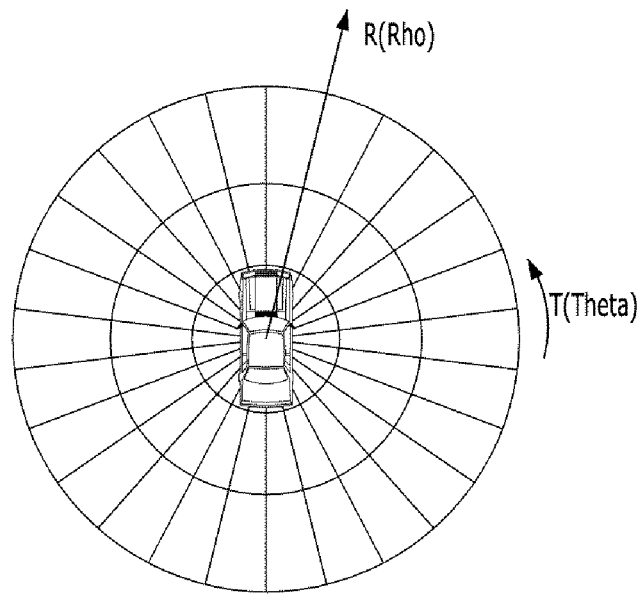
FIGS. 11A and 11B are diagrams showing radial maps corresponding to a cylindrical coordinate system according to an exemplary embodiment of the present disclosure.
Figure 11B:
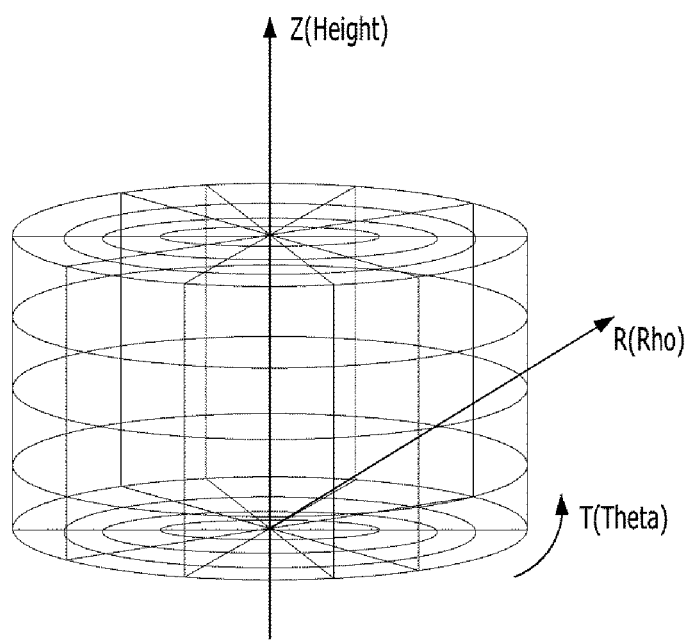

$y \geq y_p$ when $z_p=0$ and $z_p=0$ and $y_p > y_s$
$y \leq y_p$ when $x_p=0$ and $z_p=0$ and $y_p < y_s$
$x \geq x_p$ when $y_p=0$ and $z_p=0$ and $x_p > x_s$
$x \leq x_p$ when $y_p=0$ and $z_p=0$ and $x_p < x_s$
$z \geq z_p$ when $x_p=0$ and $y_p=0$ and $z_p > z_s$
$z \leq z_p$ when $x_p=0$ and $y_p=0$ and $z_p < z_s$ FIGS. 10A and 10B are diagrams showing lattice maps corresponding to an orthogonal coordinate system and FIGS. 11A and 11B are diagrams showing radial maps corresponding to a cylindrical coordinate system. The present disclosure may be configured to generate a 2D or 3D map according to system requirements.

As shown in FIGS. 10A and 10B, the present disclosure may be configured to generate lattice maps having x, y and z axes in the case of the orthogonal coordinate system. In some cases, the present disclosure may be configured to generate radial maps having theta, rho and height axes based on the cylindrical coordinate system, as shown in FIGS. 11A and 11B.

Further, the present disclosure may use only (x, y) coordinate values for 3D LIDAR point data acquired as (x, y, z) without using a z value indicating height in the case of a 2D map. In particular, the present disclosure may be configured to perform the height thresholding process using the z value. In addition, the present disclosure may use all of (x, y, z) coordinate values for 3D LIDAR point data acquired as (x, y, z) in the case of a 3D map.

Additionally, in the present disclosure, mathematical expressions with respect to half lines may be changed according to coordinate system type. Further, variables of a map, such as a cell width, depth and height, may be variably controlled according to purposes of a system and a developer.

As described above, the present disclosure may be configured to generate a map for space classification and, particularly, generate a 2D map or a 3D map according to system requirements of the host vehicle. When a half line with respect to an obstacle point is derived using only (x, y) coordinate values from among 3D point data (x, y, z) acquired from the LIDAR sensor, the present disclosure may be configured to generate a 2D map. If a half line with respect to an obstacle point is derived using the coordinate values of 3D point data (x, y, z) acquired from the LIDAR sensor, the present disclosure may be configured to generate a 3D map.

Figure 12:
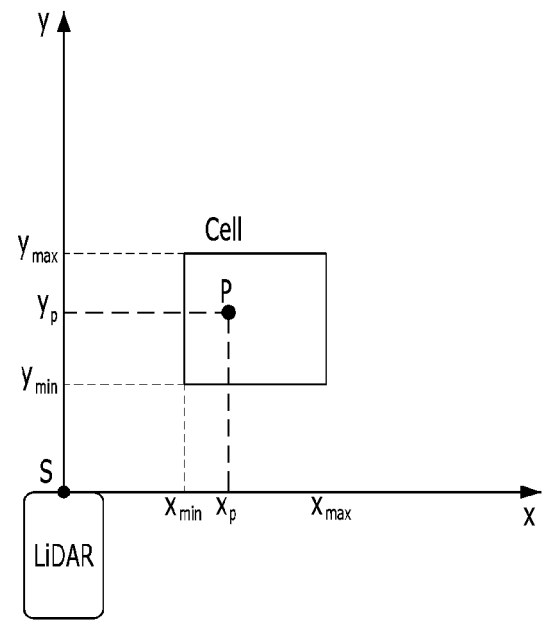
FIG. 12 is a diagram for describing a process of checking an obstacle point in a cell of a 2D map according to an exemplary embodiment of the present disclosure.

FIG. 12 is a diagram for describing a process of checking an obstacle point in a cell of a 2D map. As shown in FIG. 12, the present disclosure may be configured to check whether an obstacle point P is present for each cell of the 2D map. In particular, in response to determining that the coordinates of the obstacle point P are $P(x_p, y_p)$ and the coordinates of a single cell point have $x_{min}$, $x_{max}$, $y_{min}$ and $y_{max}$, the present disclosure may be configured to confirm that the obstacle point P is present in the corresponding cell when the obstacle point P satisfies both the first condition of $x_{min} < x_p < x_{max}$ and the second condition of $y_{min} < y_p < y_{max}$. Here, $x_{min}$ represents a value having a minimum x value from among vertexes of the cell and $x_{max}$ represents a value having a maximum x value from among the vertexes of the cell. $y_{min}$ represents a value having a minimum y value from among the vertexes of the cell and $y_{max}$ represents a value having a maximum y value from among the vertexes of the cell.

Figure 13:
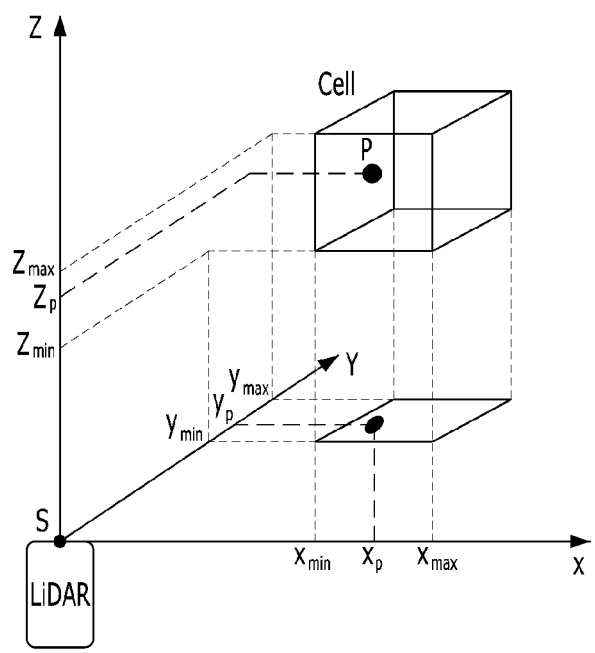
FIG. 13 is a diagram for describing a process of checking an obstacle point in a cell of a 3D map according to an exemplary embodiment of the present disclosure.

FIG. 13 is a diagram for describing a process of checking an obstacle point in a cell of a 3D map. As shown in FIG. 13, the present disclosure may be configured to check whether an obstacle point P is present for each cell of the 3D map. In particular, in response to determining that the coordinates of the obstacle point are $P(x_p, y_p, z_p)$ and the coordinates of a single cell point have $x_{min}$, $x_{max}$, $y_{min}$, $y_{max}$, $z_{min}$, and $z_{max}$, the present disclosure may be configured to confirm that the obstacle point P is present in the corresponding cell when the obstacle point P satisfies all of the first condition of $x_{min} < x_p < x_{max}$, the second condition of $y_{min} < y_p < y_{max}$ and the third condition of $z_{min} < z_p < z_{max}$.

Here, $x_{min}$ represents a value having a minimum x value from among vertexes of the cell and $x_{max}$ represents a value having a maximum x value from among the vertexes of the cell. $y_{min}$ represents a value having a minimum y value from among the vertexes of the cell and $y_{max}$ represents a value having a maximum y value from among the vertexes of the cell. $z_{min}$ represents a value having a minimum z value from among the vertexes of the cell and $z_{max}$ represents a value having a maximum z value from among the vertexes of the cell.

Figure 14:
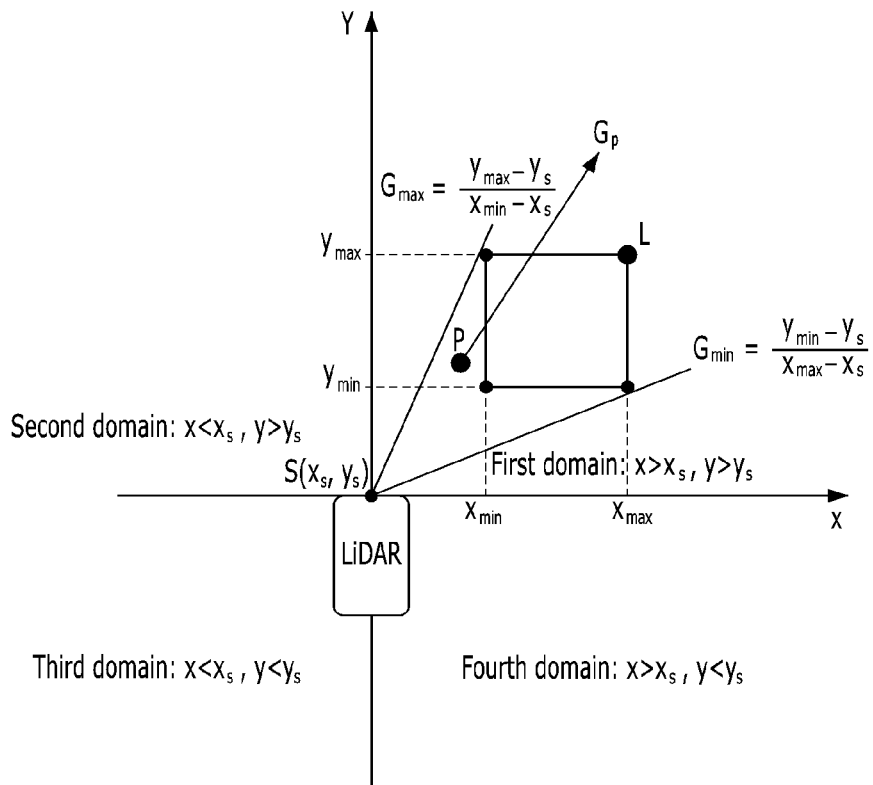
FIG. 14 is a diagram for describing a process of checking a half line in a cell of a 2D map according to an exemplary embodiment of the present disclosure.

FIG. 14 is a diagram for describing a process of checking a half line in a cell of a 2D map. As shown in FIG. 14, the present disclosure may be configured to check whether a half line with respect to an obstacle point P is present for each cell of the 2D map. In particular, when the coordinates of a cell point farthest from lidar coordinates $S(x_s, y_s)$ from among cell points of the map is $L(x_l, y_l)$, if an obstacle point that satisfies both the first condition of $x_p < x_l$ and $y_p < y_l$ and the second condition in which an obstacle point gradient is $$G_p = \frac{y_p - y_s}{x_p - x_s}$$

and a minimum gradient $G_{min}$ and a maximum gradient $G_{max}$ included in a single cell are $G_{min} < G_p < G_{max}$ is present, the present disclosure may be configured to confirm that a half line with respect to the obstacle point is present in the corresponding cell. The minimum gradient $G_{min}$ and the maximum gradient $G_{max}$ may vary according to domains where cells are positioned in the coordinate system.

In the first domain, $x > x_s$ and $y > y_s$.
In the second domain, $x < x_s$ and $y > y_s$.
In the third domain, $x < x_s$ and $y < y_s$.
In the fourth domain, $x > x_s$ and $y < y_s$.

Particularly, the first condition indicates that the obstacle point P to be detected on x and y should be present between the lidar coordinates S and the cell point L farthest from the LIDAR coordinates. The mathematical expressions described in the present disclosure are expressions for a case in which a domain to which a cell point belongs corresponds to $x_l > x_s$ and $y_l > y_s$, and signs in the mathematical expressions may be changed according to a domain to which a cell point belongs.

Figure 15:
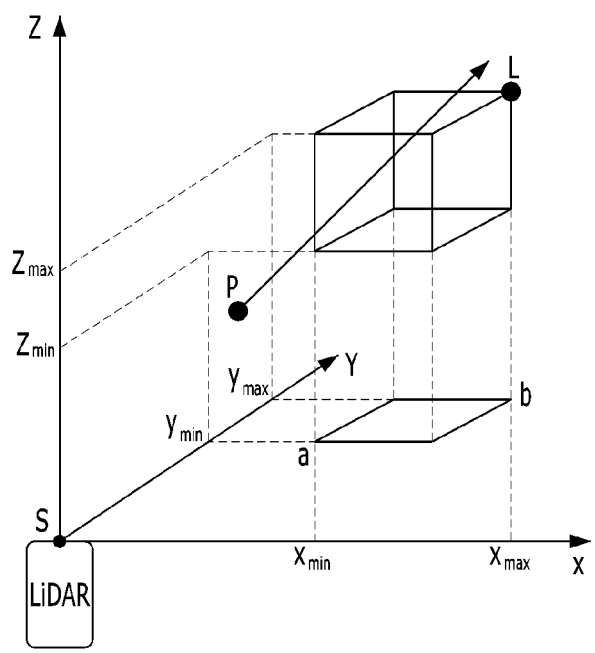
FIG. 15 is a diagram for describing a process of checking a half line in a cell of a 3D map according to an exemplary embodiment of the present disclosure.

FIG. 15 is a diagram for describing a process of checking a half line in a cell of a 3D map. As shown in FIG. 15, the present disclosure may be configured to check whether a half line with respect to an obstacle point P is present for each cell of the 3D map. In particular, in response to determining that the coordinates of a cell point farthest from lidar coordinates $S(x_s, y_s, z_s)$ from among cell points of the map are $L(x_l, y_l, z_l)$, if there is an obstacle point that satisfies the first condition of $x_p < x_l$, $y_p < y_l$ and $z_p < z_l$ and satisfies any one of the second condition in which the coordinates of a single cell point have $x_{min}$, $x_{max}$, $y_{min}$, $y_{max}$, $z_{min}$ and $z_{max}$ and y and z calculated by substituting $x_{min}$ into first and third mathematical expressions from among the first mathematical expression $$\frac{x - x_s}{x_p - x_s} = \frac{y - y_s}{y_p - y_s},$$

the second mathematical expression $$\frac{y - y_s}{y_p - y_s} = \frac{z - z_s}{z_p - z_s}$$

and the third mathematical expression $$\frac{x - x_s}{x_p - x_s} = \frac{z - z_s}{z_p - z_s}$$

are $y_{min} < y < y_{max}$ and $z_{min} < z < z_{max}$, the third condition in which y and z calculated by substituting $x_{max}$ into the first and third mathematical expressions are $y_{min} < y < y_{max}$ and $z_{min} < z < z_{max}$, the fourth condition in which x and z calculated by substituting $y_{min}$ into the first and second mathematical expressions are $x_{min} < x < x_{max}$ and $z_{min} < z < z_{max}$, the fifth condition in which x and z calculated by substituting $y_{max}$ into the first and second mathematical expressions are $x_{min} < x < x_{max}$ and $z_{min} < z < z_{max}$, the sixth condition in which y and x calculated by substituting $z_{min}$ into the second and third mathematical expressions are $y_{min} < y < y_{max}$ and $x_{min} < x < x_{max}$, and the seventh condition in which y and x calculated by substituting $z_{max}$ into the second and third mathematical expressions are $y_{min} < y < y_{max}$ and $x_{min} < x < x_{max}$, the present disclosure may be configured to confirm that a half line with respect to the obstacle point is present in the corresponding cell.

Here, $x_{min}$ represents a value having a minimum x value from among vertexes of the cell and $x_{max}$ represents a value having a maximum x value from among the vertexes of the cell. $y_{min}$ represents a value having a minimum y value from among the vertexes of the cell and $y_{max}$ represents a value having a maximum y value from among the vertexes of the cell. $z_{min}$ represents a value having a minimum z value from among the vertexes of the cell and $z_{max}$ represents a value having a maximum z value from among the vertexes of the cell.

Further, the first condition indicates that the obstacle point P to be detected on x, y and z should be present between the LIDAR coordinates S and the cell point L farthest from the LIDAR coordinates. The mathematical expressions described in the present disclosure are expressions for a case in which a domain to which a cell point belongs corresponds to $x_l > x_s$, $y_l > y_s$ and $z_l > z_s$, and signs in the mathematical expressions may be changed according to a domain to which a cell point belongs.

Figure 16:
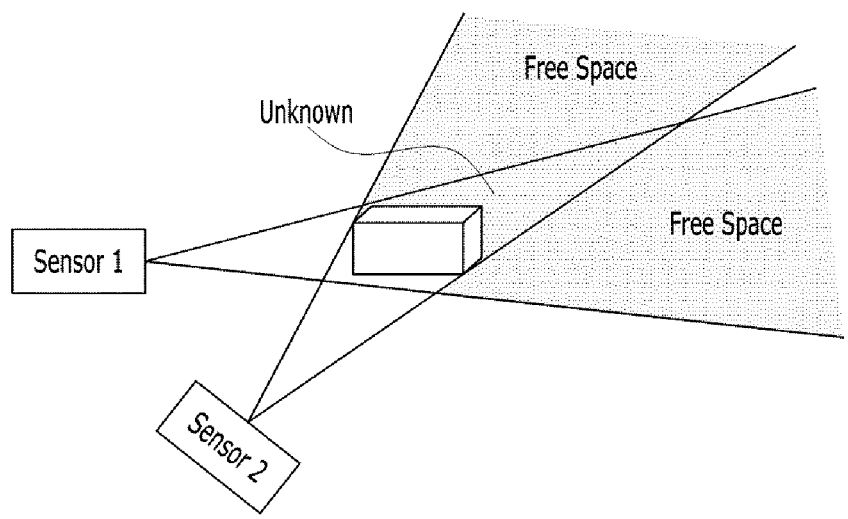
FIG. 16 is a diagram for describing a process of combining cell states of a 2D map according to an exemplary embodiment of the present disclosure.

FIG. 16 is a diagram for describing a method of combining cell states of a 2D map. As shown in FIG. 16, when there are a plurality of LIDAR sensors, the present disclosure may be configured to detect a final free space by combining cell states for the respective LIDAR sensors. In particular, the present disclosure may be configured to detect a final free space by combining cell states for the respective LIDAR sensors based on a degree of priority for each cell state.

For example, with respect to a degree of priority for each cell state, a degree of priority of a cell state corresponding to an occupied state may be highest, a degree of priority of a cell state corresponding to an unknown state may be lowest, and a degree of priority of a cell state corresponding to a free space state may be lower than the degree of priority of the occupied state and higher than the degree of priority of the unknown state.

For example, when a cell corresponding to only one of n LIDAR sensors is detected as a cell in an occupied state, the present disclosure may be configured to determine the state of the cell as the occupied state. As another example, when a cell corresponding to only one of n LIDAR sensors is detected as a cell in a free space state and all cells corresponding to the remaining LIDAR sensors are detected as cells in an unknown state, the present disclosure may be configured to determine the state of the cell as the free space state. In this manner, although a map is a common space shared by all sensors and thus all of settings and a state for each sensor need to be considered, the present disclosure may be configured to combine cell states using only cell states of a map.

Figure 17:
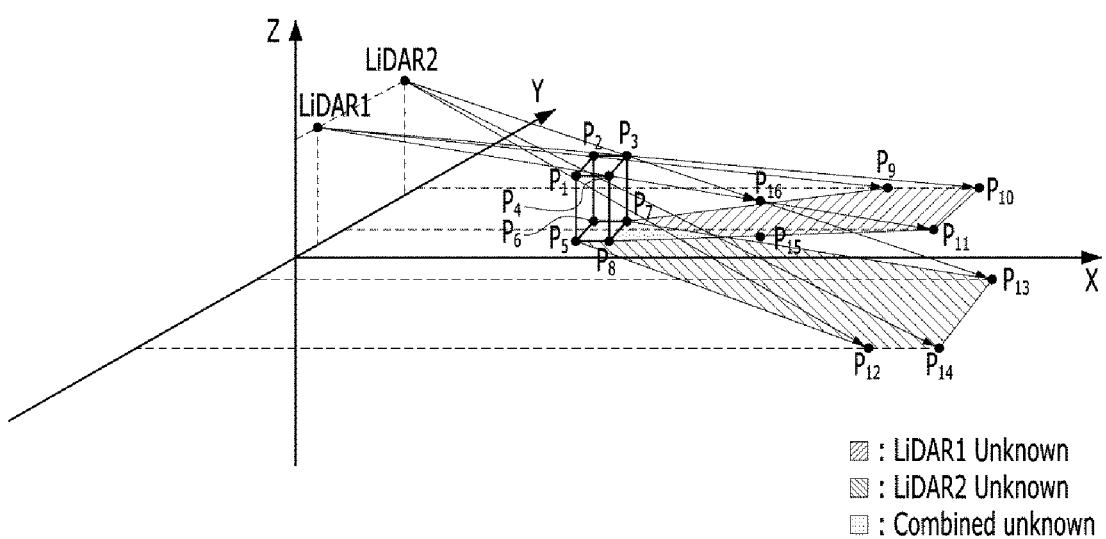
FIG. 17 is a diagram for describing a process of combining cell states of a 3D map according to an exemplary embodiment of the present disclosure.

FIG. 17 is a diagram for describing a process of combining cell states of a 3D map. As shown in FIG. 17, when a plurality of LIDAR sensors having different FOV is used, the present disclosure may secure an additional free space by observing a blind area that is unable to be observed by each LIDAR sensor using other lidar sensors.

For example, when an unknown area of a first LIDAR sensor has a polyhedral volume formed by connecting points $P_2$, $P_3$, $P_4$, $P_6$, $P_7$, $P_8$, $P_9$, $P_{10}$ and $P_{11}$ and an unknown area of a second lidar sensor has a polyhedral volume formed by connecting points $P_1$, $P_3$, $P_4$, $P_5$, $P_7$, $P_8$, $P_{12}$, $P_{13}$ and $P_{14}$, a combined unknown area may have a polyhedral volume formed by connecting points $P_3$, $P_4$, $P_7$, $P_8$, $P_{15}$ and $P_{16}$. Accordingly, when cell states are combined, an unknown area may be reduced compared to when a single LIDAR sensor is used, and thus an additional free space may be secured. In this manner, when LIDAR sensors have different FOVs, the present disclosure may be configured to combine cell states for the LIDAR sensors having different FOVs to secure an additional free space and detect a final free space including the additional free space.

Figure 18:
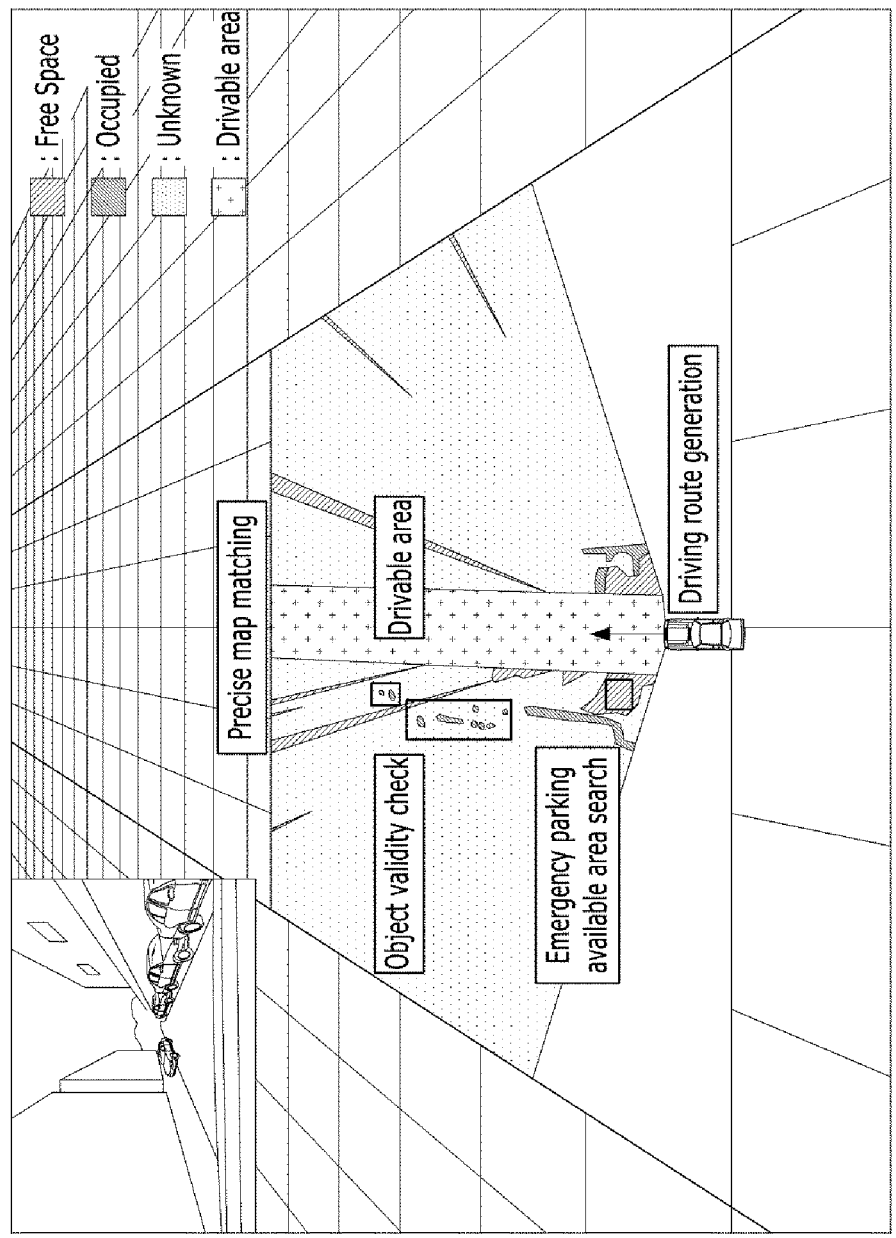
FIG. 18 is a diagram showing a free space output result according to an exemplary embodiment of the present disclosure.

FIG. 18 is a diagram showing a free space output result. As shown in FIG. 18, when a free space is detected, the present disclosure may be configured to generate a driving route through a determination system, search for a parking available area in an emergency situation, check object validity through a recognition system, perform precise map matching through a positioning system, and extract a drivable area.

In particular, generation of a driving route may be a process of generating a route through which a vehicle will arrive at a destination using a detected free space. Further, searching for an emergency parking available area may be a process of searching for a safe free space in which a vehicle may be parked in an emergency situation. Further, object validity checking may be a process of checking whether an object is an unnecessary object detected in an area other than free spaces since a driving route is unable to be generated in areas other than free spaces.

Further, precise map matching may be a process of recognizing a driving environment by matching information on a detected free space with positioning information on an accurate map. Additionally, extracting a drivable area may be a process of extracting road boundaries using detected free space information to extract an actual drivable area in consideration of a driving environment. In this manner, the present disclosure may use a detected free space for a driving environment determination system, a driving route generation system, a positioning system, and the like.

Furthermore, the present disclosure is applicable to any type of LIDAR sensor having an output format of point cloud data. Moreover, the present disclosure is applicable to all systems capable of performing a code operation, such as PC systems such as Windows PC and LINUX PC, and vehicle embedded systems such as DRV II board.

Figure 19:
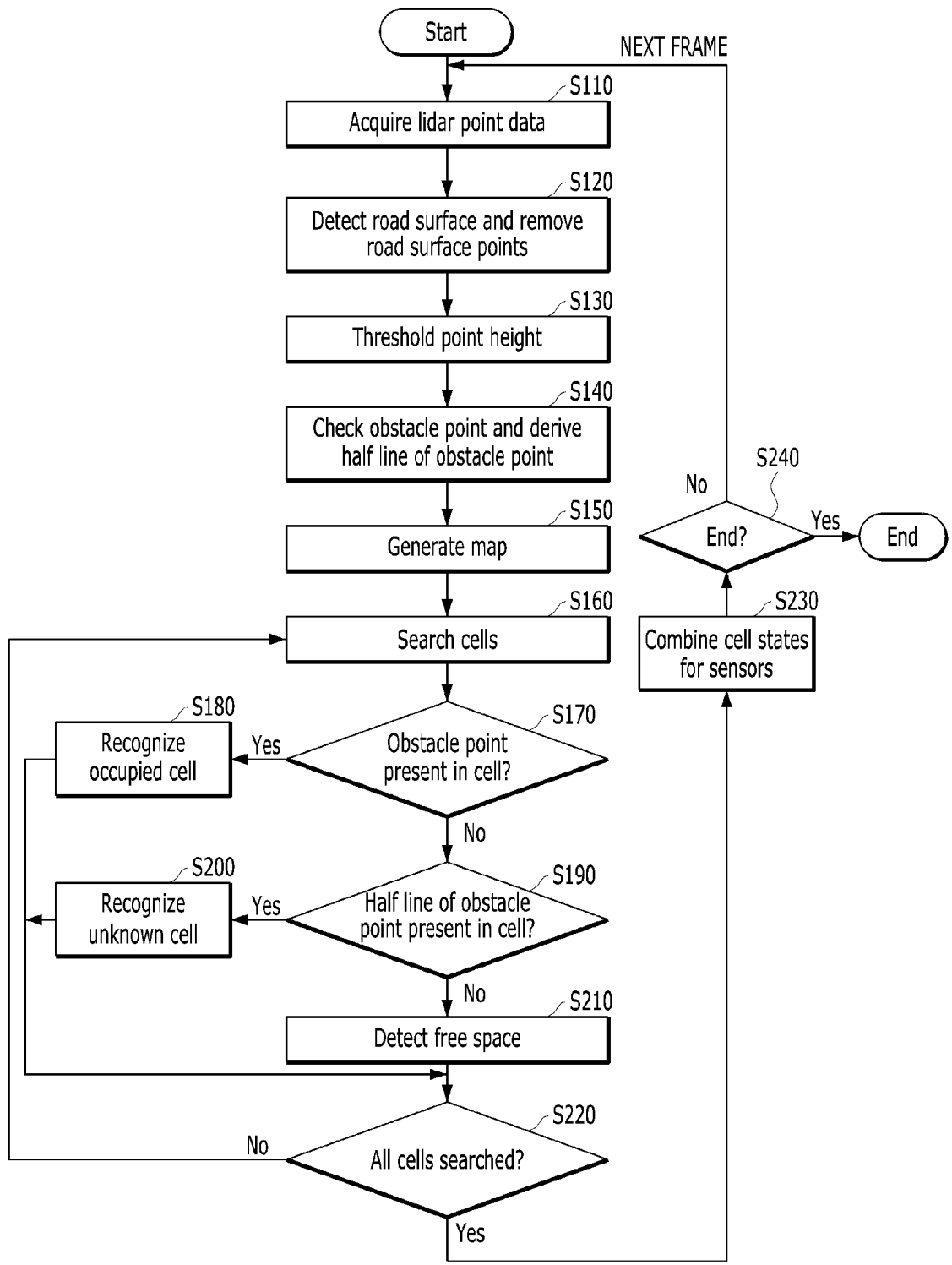
FIG. 19 is a flowchart for describing a free space detection method according to an exemplary embodiment of the present disclosure.

FIG. 19 is a flowchart for describing a method for detecting a free space according to an exemplary embodiment of the present disclosure. Notably, the method described herein may be executed by a controller. As shown in FIG. 19, the present disclosure may be configured to acquire LIDAR point data (S110) and detect road surface points from the acquired LIDAR point data and remove road surface points (S120).

Subsequently, the present disclosure may be configured to calculate a safe height based on the height of a host vehicle and perform point thresholding to remove points lower than the safe height (S130). Subsequently, the present disclosure may be configured to detect obstacle points and derive half lines with respect to obstacle points based on the coordinates of the obstacle points (S140). In particular, the present disclosure may be configured to derive half lines that have gradients connecting the obstacle points and LIDAR coordinates and extend in a LIDAR beam scanning direction having the obstacle points as starting points.

Subsequently, the present disclosure may be configured to generate a map for space classification (S150). The present disclosure may then be configured to search cells of the map (S160) and check whether obstacle points are present in cells (S170). In response to determining that an obstacle point is present in a cell, the present disclosure may be configured to recognize the state of the cell as an occupied state (S180).

When no obstacle point is present in a cell, the present disclosure may be configured to check whether a half line with respect to an obstacle point is present in the cell (S190). In response to determining that the half line with respect to the obstacle point is present in the cell, the present disclosure may be configured to recognize the state of the cell as an unknown state (S200). When the half line with respect to the obstacle point is not present in the cell, the present disclosure may be configured to recognize the state of the cell as a free space state and detect a free space (S210).

Subsequently, the present disclosure may be configured to check whether all cells of the map have been searched (S220). In response to determining that all cells of the map have been searched, the present disclosure may be configured to detect a final free space by combining cell states for LIDAR sensors (S230). Subsequently, the present disclosure may be configured to check whether free space detection is completed (S240) and repeat the free space detection process in the next frame when free space detection is not completed.

Accordingly, the present disclosure may be configured to detect a correct and accurate free space while minimizing the number of calculations and possibility of misrecognition by deriving obstacle points and half lines thereof from point data of a LIDAR sensor and determining cell states of a map. In other words, the present disclosure may secure a safe free space that is less likely to be misrecognized using LIDAR that is a distance sensor with higher performance than a vision sensor.

Furthermore, the present disclosure may be configured to detect a free space with high accuracy using LIDAR point data that is a 3D feature. Moreover, the present disclosure may be configured to detect a free space with high reliability with a smaller number of calculations. Furthermore, the present disclosure may generate a reliable driving route.

The present disclosure may be applied to a camera and a redundancy system of a radar free space detection system. Further, the present disclosure may maintain the performance necessary to independently generate a driving route even when the camera and the radar free space detection system fail. Additionally, the present disclosure may improve the operation speed of a recognition system and conserve a memory by checking object validity.

Further, the present disclosure may use a detected free space for a driving environment determination system, a driving route generation system, a positioning system, and the like. Furthermore, the present disclosure is applicable to any type of LIDAR sensor having an output format of point cloud data. Moreover, the present disclosure is applicable to all systems capable of performing a code operation, such as PC systems such as Windows PC and LINUX PC, and vehicle embedded systems such as DRV II board.

The present disclosure may be realized as a non-transitory computer-readable recording medium storing a program for executing the free space detection method of the free space detection apparatus and may perform processes provided in the free space detection method of the free space detection apparatus.

The above-described present disclosure may be realized as non-transitory computer-readable code in a medium in which a program is recorded. The non-transitory computer-readable media include all types of recording devices in which data readable by computer systems is stored. Examples of computer-readable media include a hard disk drive (HDD), a solid state drive (SSD), a silicon disk drive (SDD), a ROM, a RAM, a CD-ROM, a magnetic tape, a floppy disk, an optical data storage device, etc.

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A free space detection apparatus, comprising:
a point data processor configured to remove noise of point data acquired from a LIDAR sensor and derive a half line with respect to an obstacle point;
a map processor configured to generate a map for space classification, check whether the obstacle point or the half line with respect to the obstacle point is present in a cell of the map and determine cell states of the map based on a result of checking whether the obstacle point of the half line is present in the cell of the map; and
a free space detector configured to detect a free space in which no obstacle is present based on the cell states of the map,
wherein the point data processor is configured to derive the half line having a gradient connecting the obstacle point and LIDAR coordinates and extend a LIDAR beam scanning direction having the obstacle point as a starting point,
wherein the map processor is configured to check whether the obstacle point is present in the cell based on a first condition and a second condition or check whether the half line with respect to the obstacle point is present in the cell based on a third condition,
the first condition including, that x coordinate value of the obstacle point is greater than $x_{min}$ representing a value having a minimum x value from among vertexes of the cell and less than $x_{max}$ representing a value having a maximum x value from among the vertexes of the cell,
the second condition including that y coordinate value of the obstacle point is greater than $y_{min}$ representing a value having a minimum y value from among the vertexes of the cell and less than $y_{max}$ representing a value having a maximum y value from among the vertexes of the cell, and
the third condition including that the x coordinate value and the y coordinate value of the obstacle point be present between LIDAR coordinates and coordinates of a cell point farthest from the LIDAR coordinates from among cell points of the map.

2. The free space detection apparatus of claim 1, wherein, when removing the noise of the point data, the point data processor is configured to detect road surface points from the point data acquired from the LIDAR sensor, recognize the detected road surface points as the noise and remove the noise.

3. The free space detection apparatus of claim 1, wherein, when removing the noise of the point data, the point data processor is configured to calculate a safe height based on a height of a host vehicle and remove points lower than the safe height by thresholding the points.

4. The free space detection apparatus of claim 1, wherein, when checking whether the obstacle point is present in a cell of the map, the map processor is configured to confirm that the obstacle point is present in the cell if the first condition and the second condition are satisfied.

5. The free space detection apparatus of claim 1, wherein, when checking whether the obstacle point is present in a cell of the map, the map processor is configured to confirm that the obstacle point is present in the cell if the first condition, the second condition and a fourth condition are satisfied, and the fourth condition including that z coordinate value of the obstacle point is greater than $z_{min}$ representing a value having a minimum z value from among the vertexes of the cell and less than $z_{max}$ representing a value having a maximum z value from among the vertexes of the cell.

6. The free space detection apparatus of claim 1, wherein, when checking whether the half line with respect to the obstacle point is present in a cell of the map, the map processor is configured to confirm that the half line with respect to the obstacle point is present in the cell if the obstacle point satisfies both the third condition and a fourth condition in which the obstacle point has a gradient of $$G_p = \frac{y_p - y_s}{x_p - x_s}$$

and a minimum gradient $G_{min}$ and maximum gradient $G_{max}$ included in a cell are $G_{min} < G_p < G_{max}$ when coordinates of a cell point farthest from LIDAR coordinates $S(x_s, y_s)$ from among cell points of the map are $L(x_l, y_l)$, wherein $x_p$ is the x coordinate value of the obstacle point and $y_p$ is the y coordinate value of the obstacle point.

7. The free space detection apparatus of claim 1,
wherein the third condition further includes that z coordinate value of the obstacle point be present between the LIDAR coordinates and coordinates of the cell point farthest from the LIDAR coordinates from among the cell points of the map;
wherein, when checking whether the half line with respect to the obstacle point is present in a cell of the map, the map processor is configured to confirm that the half line with respect to the obstacle point is present in the cell if the third condition and satisfies any one of:
a fifth condition in which the coordinates of the single cell point have $x_{min}$, $x_{max}$, $y_{min}$, $y_{max}$, $z_{min}$ and $z_{max}$ and y and z calculated by substituting $x_{min}$ into first and third mathematical expressions from among the first mathematical expression $$\frac{x - x_s}{x_p - x_s} = \frac{y - y_s}{y_p - y_s},$$

a second mathematical expression $$\frac{y - y_s}{y_p - y_s} = \frac{z - z_s}{z_p - z_s}$$

and the third mathematical expression $$\frac{x - x_s}{x_p - x_s} = \frac{z - z_s}{z_p - z_s}$$

are $(y_{min} < y < y_{max})$ and $(z_{min} < z < z_{max})$,
a sixth condition in which y and z calculated by substituting $x_{max}$ into the first and third mathematical expressions are $(y_{min} < y < y_{max})$ and $(z_{min} < z < z_{max})$, a seventh condition in which x and z calculated by substituting $y_{min}$ into the first and second mathematical expressions are ($x_{min}$ x<$x_{max}$) and ($z_{min}$<z<$z_{max}$), a eighth condition in which x and z calculated by substituting $y_{max}$ into the first and second mathematical expressions are ($x_{min}$<x<$x_{max}$) and ($z_{min}$<z<$z_{max}$), a ninth condition in which y and x calculated by substituting $z_{min}$ into the second and third mathematical expressions are ($y_{min}$<y<$y_{max}$) and ($x_{min}$<x<$x_{max}$), and a tenth condition in which y and x calculated by substituting $z_{max}$ into the second and third mathematical expressions are ($y_{min}$<y<$y_{max}$) and ($x_{min}$<x<$x_{max}$) when coordinates of a cell point farthest from LIDAR coordinates $S(x_s, y_s, z_s)$ from among cell points of the map are $L(x_l, y_l, z_l)$.

8. The free space detection apparatus of claim 1, wherein the map processor is configured to determine a state of a cell as an occupied state when an obstacle point is present in the cell, determine the cell state as an unknown state in response to determining that a half line of an obstacle point is present in the cell, and determine the cell state as a free space state in response to determining that any of an obstacle point and a half line of the obstacle point is not present in the cell.

9. The free space detection apparatus of claim 1, wherein, when a plurality of LIDAR sensors are provided, the free space detector is configured to detect a final free space by combining cell states for the respective LIDAR sensors.

10. The free space detection apparatus of claim 9, wherein, when detecting the final free space, the free space detector is configured to detect the final free space by combining cell states for the respective LIDAR sensors based on a degree of priority for each cell state.

11. A free space detection method of a free space detection apparatus including a point data processor, a map processor and a free space detector, the method comprising:
  acquiring, by the point data processor, LIDAR point data;
  removing, by the point data processor, noise of the LIDAR point data;
  deriving, by the point data processor, a half line with respect to an obstacle point from which noise has been removed based on coordinates of the obstacle point;
  generating, by the map processor, a map for space classification;
  checking, by the map processor, whether the obstacle point or the half line with respect to the obstacle point is represent in a cell of the map;
  determining, by the map processor, cell states of the map based on a result of the checking; and
  detecting, by the free space detector, a free space in which no obstacle is present based on the cell states of the map;
  wherein the deriving of the half line with respect to the obstacle point includes deriving the half line having a gradient connecting the obstacle point and LIDAR coordinates and extending a LIDAR beam scanning direction having the obstacle point as a starting point;
  wherein the checking includes checking whether the obstacle point is present in the cell based on a first condition and a second condition or checking whether the half line with respect to the obstacle point is present in the cell based on a third condition;
  the first condition including that x coordinate value of the obstacle point is greater than $x_{min}$ representing a value having a minimum x value from among vertexes of the cell and less than $x_{max}$ representing a value having a maximum x value from among the vertexes of the cell;
  the second condition including that y coordinate value of the obstacle point is greater than $y_{min}$ representing a value having a minimum y value from among the vertexes of the cell and less than $y_{max}$ representing a value having a maximum y value from among the vertexes of the cell; and
  the third condition including that the x coordinate value and the y coordinate value of the obstacle point be present between LIDAR coordinates and coordinates of a cell point farthest from the LIDAR coordinates from among cell points of the map.

12. The free space detection method of claim 11, wherein removing of noise of the point data includes detecting road surface points from the LIDAR point data, recognizing the detected road surface points as the noise and removing the noise.

13. The free space detection method of claim 11, wherein the removing of noise of the point data includes calculating a safe height based on a height of a host vehicle and removing points lower than the safe height by thresholding the points.

14. The free space detection method of claim 11, wherein the determining of cells state of the map includes determining a state of a cell as an occupied state in response to determining that an obstacle point is present in the cell, determining the cell state as an unknown state in response to determining that a half line of an obstacle point is present in the cell, and determining the cell state as a free space state in response to determining that any of an obstacle point and a half line of the obstacle point is not present in the cell.

15. The free space detection method of claim 11, wherein the detecting of a free space based on the cell states of the map includes, when a plurality of LIDAR sensors are provided, detecting a final free space by combining cell states for the respective LIDAR sensors.

16. A non-transitory computer-readable recording medium storing a program for executing the method according to claim 11.

17. A vehicle, comprising:
  a LIDAR sensor;
  a free space detection apparatus configured to detect a free space based on point data acquired from the LIDAR sensor; and
  a driving environment information providing apparatus configured to provide driving environment information based on the detected free space,
  wherein the free space detection apparatus includes:
    a point data processor configured to remove noise of point data acquired form the LIDAR sensor and derive a half line with respect to an obstacle point from which noise has been removed based on coordinates of the obstacle point;
    a map processor configured to generate a map for space classification, check whether the obstacle point or the half line with respect to the obstacle point is present in a cell of the map and determine cell states of the map based on a result of checking whether the obstacle point of the half line is present in the cell of the map; and
    a free space detector configured to detect a free space in which no obstacle is present based on the cell states of the map;
    wherein the point data processor is configured to derive the half line having a gradient connecting the obstacle point and LIDAR coordinates and extend a LIDAR beam scanning direction having the obstacle point as a starting point;

wherein the map processor is configured to check whether the obstacle point is present in the cell based on a first condition and a second condition or check whether the half line with respect to the obstacle point is present in the cell based on a third condition;

the first condition including that x coordinate value of the obstacle point is greater than $x_{min}$ representing a value having a minimum x value from among vertexes of the cell and less than $x_{max}$ representing a value having a maximum x value from among the vertexes of the cell;

the second condition including that y coordinate value of the obstacle point is greater than $y_{min}$ representing a value having a minimum y value from among the vertexes of the cell and less than $y_{max}$ representing a value having a maximum y value from among the vertexes of the cell; and the third condition including that the x coordinate value and the y coordinate value of the obstacle point be present between LIDAR coordinates and coordinates of a cell point farthest from the LIDAR coordinates from among cell points of the map.

18. The vehicle of claim 17, further comprising, where a plurality of LIDAR sensors are provided, a free space combining device configured to combine free spaces detected for the respective LIDAR sensors.

* * * * *